(12) United States Patent
Ono et al.

(10) Patent No.: US 11,059,495 B2
(45) Date of Patent: Jul. 13, 2021

(54) INFORMATION PRESENTATION APPARATUS, STEERING APPARATUS, AND INFORMATION PRESENTATION METHOD

(71) Applicants: SONY CORPORATION, Tokyo (JP); SONY SEMICONDUCTOR SOLUTIONS CORPORATION, Kanagawa (JP)

(72) Inventors: Akira Ono, Kanagawa (JP); Hirokazu Hashimoto, Tokyo (JP); Hiroshi Uji, Tokyo (JP)

(73) Assignees: SONY CORPORATION, Tokyo (JP); SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 144 days.

(21) Appl. No.: 16/328,066

(22) PCT Filed: Aug. 18, 2017

(86) PCT No.: PCT/JP2017/029610
§ 371 (c)(1),
(2) Date: Feb. 25, 2019

(87) PCT Pub. No.: WO2018/047604
PCT Pub. Date: Mar. 15, 2018

(65) Prior Publication Data
US 2019/0185021 A1    Jun. 20, 2019

(30) Foreign Application Priority Data
Sep. 12, 2016 (JP) .............................. JP2016-177706

(51) Int. Cl.
*B60W 50/16* (2020.01)
*G08G 1/16* (2006.01)
(Continued)

(52) U.S. Cl.
CPC .......... *B60W 50/16* (2013.01); *B62D 15/029* (2013.01); *G06K 9/00845* (2013.01); *G08G 1/16* (2013.01);
(Continued)

(58) Field of Classification Search
CPC ............. B60W 10/20; B60W 2540/18; B60W 2540/22; B60W 2554/00;
(Continued)

(56) References Cited

U.S. PATENT DOCUMENTS 7,739,008 B2 *  6/2010  Cieler ................... B60W 50/16
                                                            701/36
8,942,892 B2 *  1/2015  Veen .................... B60N 2/0276
                                                            701/49
(Continued)

FOREIGN PATENT DOCUMENTS

JP    2010-133810 A    6/2010
JP    2010-260439 A    11/2010
(Continued)

OTHER PUBLICATIONS

International Search Report and Written Opinion of PCT Application No. PCT/JP2017/029610, dated Oct. 31, 2017, 08 pages of ISRWO.
(Continued)

*Primary Examiner* — Tyler J Lee
(74) *Attorney, Agent, or Firm* — Chip Law Group

(57) ABSTRACT

An information presentation apparatus includes an acquisition unit, an asymmetric acceleration generating unit, and a signal generating unit. The acquisition unit acquires at least one of information inside a vehicle or information outside the vehicle. The asymmetric acceleration generating unit presents haptic feedback information to a user via a steering unit provided in the vehicle by generating asymmetric
(Continued)

acceleration. The signal generating unit generates a driving signal on the basis of information acquired by the acquisition unit and send the driving signal to the asymmetric acceleration generating unit.

17 Claims, 15 Drawing Sheets

(51) Int. Cl.
    *B62D 15/02*     (2006.01)
    *G06K 9/00*     (2006.01)

(52) U.S. Cl.
    CPC ......... *G08G 1/162* (2013.01); *B60W 2540/18* (2013.01)

(58) Field of Classification Search
    CPC ............ B60W 2554/801; B60W 50/16; B62D 15/029; G06K 9/00845; G08G 1/16; G08G 1/162; G08G 1/166
    See application file for complete search history.

(56) References Cited

U.S. PATENT DOCUMENTS

| | | | | |
|---|---|---|---|---|
| 9,290,125 | B2* | 3/2016 | Nagata | B60Q 9/00 |
| 9,527,528 | B1* | 12/2016 | Harrison | B62D 6/00 |
| 9,827,904 | B2* | 11/2017 | Modarres | B60Q 9/008 |
| 10,671,170 | B2* | 6/2020 | Boulanger | G06F 9/3004 |
| 2004/0061600 | A1* | 4/2004 | Wehner | G08G 1/166 |
| | | | | 340/435 |
| 2008/0024284 | A1* | 1/2008 | Baratoff | G08G 1/161 |
| | | | | 340/435 |
| 2009/0073112 | A1* | 3/2009 | Basson | G06F 3/016 |
| | | | | 345/156 |
| 2009/0157247 | A1* | 6/2009 | Sjogren | B62D 1/28 |
| | | | | 701/23 |
| 2010/0198458 | A1* | 8/2010 | Buttolo | G01C 21/3652 |
| | | | | 701/36 |
| 2012/0126965 | A1* | 5/2012 | Sanma | B62D 15/029 |
| | | | | 340/438 |
| 2012/0267221 | A1* | 10/2012 | Gohng | G06F 3/0338 |
| | | | | 200/61.54 |
| 2015/0005984 | A1* | 1/2015 | De Los Santos | H04L 67/125 |
| | | | | 701/2 |
| 2015/0175172 | A1* | 6/2015 | Truong | G06F 3/017 |
| | | | | 701/36 |
| 2015/0197283 | A1* | 7/2015 | Marti | B62D 15/029 |
| | | | | 701/41 |
| 2015/0268722 | A1* | 9/2015 | Wang | G06F 3/016 |
| | | | | 345/156 |
| 2016/0107570 | A1* | 4/2016 | Modarres | B60Q 9/008 |
| | | | | 340/435 |
| 2016/0334901 | A1* | 11/2016 | Rihn | B60K 35/00 |
| 2017/0021762 | A1* | 1/2017 | Daman | B60K 35/00 |

FOREIGN PATENT DOCUMENTS

| | | |
|---|---|---|
| JP | 2013-159151 A | 8/2013 |
| JP | 2015-184110 A | 10/2015 |
| JP | 2015-225359 A | 12/2015 |
| WO | 2011/071044 A1 | 6/2011 |

OTHER PUBLICATIONS

Office Action for JP Patent Application No. 2018-538334, dated Apr. 27, 2021, 05 pages of English Translation and 05 pages of Office Action.

* cited by examiner

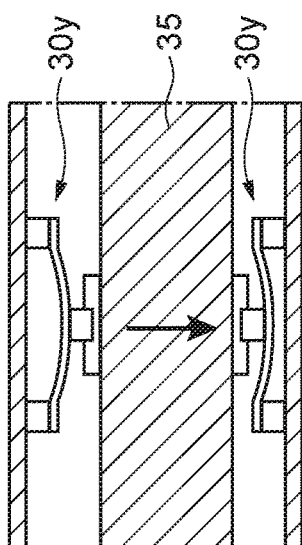
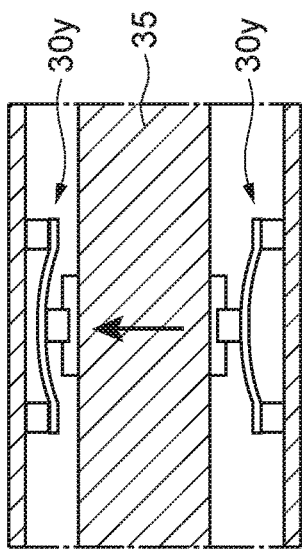
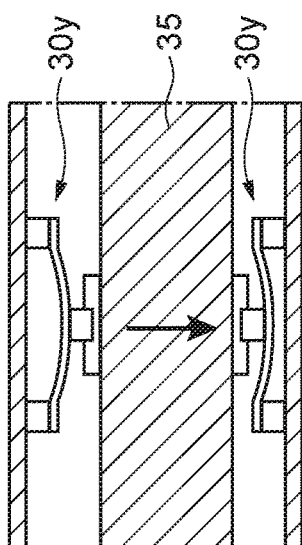
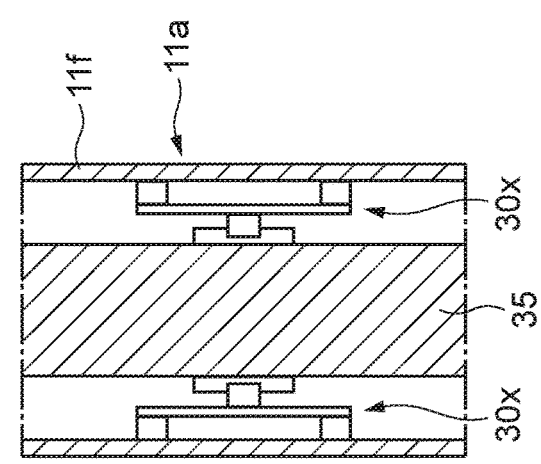
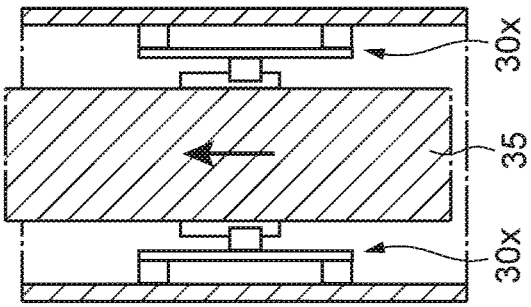
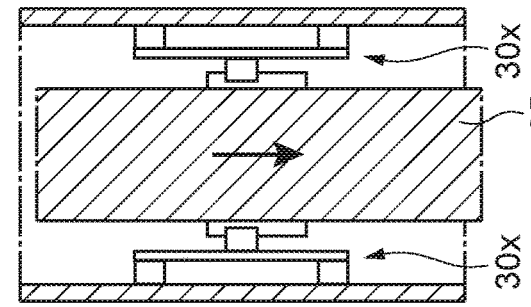

INFORMATION PRESENTATION APPARATUS, STEERING APPARATUS, AND INFORMATION PRESENTATION METHOD

CROSS REFERENCE TO RELATED APPLICATIONS

This application is a U.S. National Phase of International Patent Application No. PCT/JP2017/029610 filed on Aug. 18, 2017, which claims priority benefit of Japanese Patent Application No. JP 2016-177706 filed in the Japan Patent Office on Sep. 12, 2016. Each of the above-referenced applications is hereby incorporated herein by reference in its entirety.

TECHNICAL FIELD

The present technology relates to a technology such as an information presentation apparatus which is primarily installed in a vehicle and presents necessary information to a user.

BACKGROUND ART

Patent Literature 1 has disclosed an information presentation apparatus provided in a vehicle such as an automobile and including a steering wheel including a plurality of vibrators. A control unit of this information presentation apparatus cooperates with a car navigation system and selects a vibrator from among the plurality of vibrators, which should be driven in accordance with information to be presented to a driver. The control unit executes a driving method, for example, sending a driving signal to only one selected vibrator or sequentially sending driving signals such that the plurality of vibrators have different vibration start times.

CITATION LIST

Patent Literature

Patent Literature 1: International Publication WO2011/071044

DISCLOSURE OF INVENTION

Technical Problem

In Patent Literature 1 above, on a mode on which the plurality of vibrators are sequentially driven, a user (driver) needs to wait for presentation of that information until the sequential driving of those vibrators is completed. That is, there is a problem in that the intuitiveness is not good since it takes long time to present the haptic feedback information.

It is an object of the present disclosure to provide an information presentation apparatus or an information presentation method, with which haptic feedback information intuitive for a user who steers a vehicle can be presented to the user, and a steering apparatus using the same.

Solution to Problem

In order to accomplish the above-mentioned object, an information presentation apparatus according to the present technology includes an acquisition unit, an asymmetric acceleration generating unit, and a signal generating unit.

The acquisition unit is configured to acquire at least either one of information inside a vehicle or information outside the vehicle.

The asymmetric acceleration generating unit is configured to present haptic feedback information to a user via a steering unit provided in the vehicle by generating asymmetric acceleration.

The signal generating unit is configured to generate a driving signal on the basis of information acquired by the acquisition unit and send the driving signal to the asymmetric acceleration generating unit.

In the present technology, not simple vibration, but the haptic feedback information based on the information inside the vehicle and/or the information outside the vehicle is presented to a user by the asymmetric acceleration generating unit via the steering unit. With this, the user can receive presentation of intuitive haptic feedback information and can receive appropriate steering assistance.

The signal generating unit may be configured to generate, in accordance with a motion of a movable object within a predetermined range from the vehicle, such a driving signal that the asymmetric acceleration changes.

With this, the user can receive presentation of haptic feedback information corresponding to the motion of the movable object.

The signal generating unit may be configured to generate, in accordance with a relative position between the vehicle and the movable object, such a driving signal that a direction of the asymmetric acceleration changes.

The signal generating unit may be configured to generate, in accordance with a distance between the vehicle and the movable object, such a driving signal that magnitude of the asymmetric acceleration changes.

The information presentation apparatus may further include a sensor configured to detect a steering angle of the steering unit. The signal generating unit may be configured to further generate the driving signal on the basis of the detected steering angle of the steering unit.

With this, the signal generating unit is capable of generating a driving signal for presenting haptic feedback information having an appropriate sense of direction for any steering angle by the user.

The acquisition unit may be configured to acquire a motion or physiological information of a user as the information inside the vehicle.

The acquisition unit may be configured to acquire road traffic information as the information outside the vehicle.

The asymmetric acceleration generating unit may include a mechanism that generates asymmetric acceleration in directions of one or more axes.

With this, the information presentation apparatus is capable of presenting the haptic feedback information in a direction along at least an axis to the user.

The steering unit may include a frame member.

The asymmetric acceleration generating unit may include a weight provided inside the frame member and an actuator arranged between the frame member and the weight.

The asymmetric acceleration generating unit is capable of efficiently generating asymmetric acceleration by the actuator moving the weight.

The information presentation apparatus may further include a shaft mechanism that connects the steering unit to a vehicle body, in which the asymmetric acceleration generating unit may be provided in the shaft mechanism.

That is, the asymmetric acceleration generating unit does not need to be provided inside the steering unit and may be provided in a shaft mechanism which is an external mechanism of the steering unit as described above.

The asymmetric acceleration generating unit may include at least one of a first asymmetric acceleration generating unit that generates asymmetric acceleration in an axis direction of the shaft mechanism in the steering unit, a second asymmetric acceleration generating unit that generates asymmetric acceleration in a second direction in the steering unit, the second direction being orthogonal to the axis direction, and a third asymmetric acceleration generating unit that generates asymmetric acceleration in a third direction in the steering unit, the third direction being orthogonal to the axis direction and orthogonal to the second direction.

A steering apparatus according to an embodiment includes: a steering unit; and an asymmetric acceleration generating unit configured to generate asymmetric acceleration in the steering unit.

By adding the asymmetric acceleration to the steering unit, the user can receive presentation of intuitive haptic feedback information from the steering apparatus while performing steering.

The weight may have an annular, circular arc, or rectangular parallelepiped shape.

For example, in a case where the steering unit has a circular shape, a circular arc shape, or a shape similar thereto, the weight is constituted by an annular or circular arc member, and thus the asymmetric acceleration generating unit is capable of reliably transmitting generated force to the user irrespective of positions of the steering unit, which are held by the user.

The asymmetric acceleration generating unit may further include a supporting mechanism that supports the weight.

The supporting mechanism may be a sliding mechanism that supports the weight such that the weight moves in a direction different from a direction of the asymmetric acceleration.

With this, it becomes easy for the weight to move in a direction along an axis by the actuator, and thus the amount of driving thereof can be increased.

An information presentation method according to an embodiment includes acquiring at least either one of information inside a vehicle or information outside the vehicle.

A driving signal is generated on the basis of the acquired information.

The generated driving signal is sent to an asymmetric acceleration generating unit configured to present haptic feedback information to a user via a steering unit provided inside the vehicle due to generation of asymmetric acceleration.

Advantageous Effects of Invention

As described above, the present technology can present haptic feedback information intuitive for a user who steers a vehicle to the user.

It should be noted that the effects described here are not necessarily limitative and any effect described in the present disclosure may be provided.

BRIEF DESCRIPTION OF DRAWINGS

FIGS. 10A, 10B, 10C, 10D, 10E, and 10F are diagrams depicting how the asymmetric acceleration generating unit vibrates in a y axis direction.

MODE(S) FOR CARRYING OUT THE INVENTION

Hereinafter, embodiments according to the present technology will be described with reference to the drawings.

Figure 1:
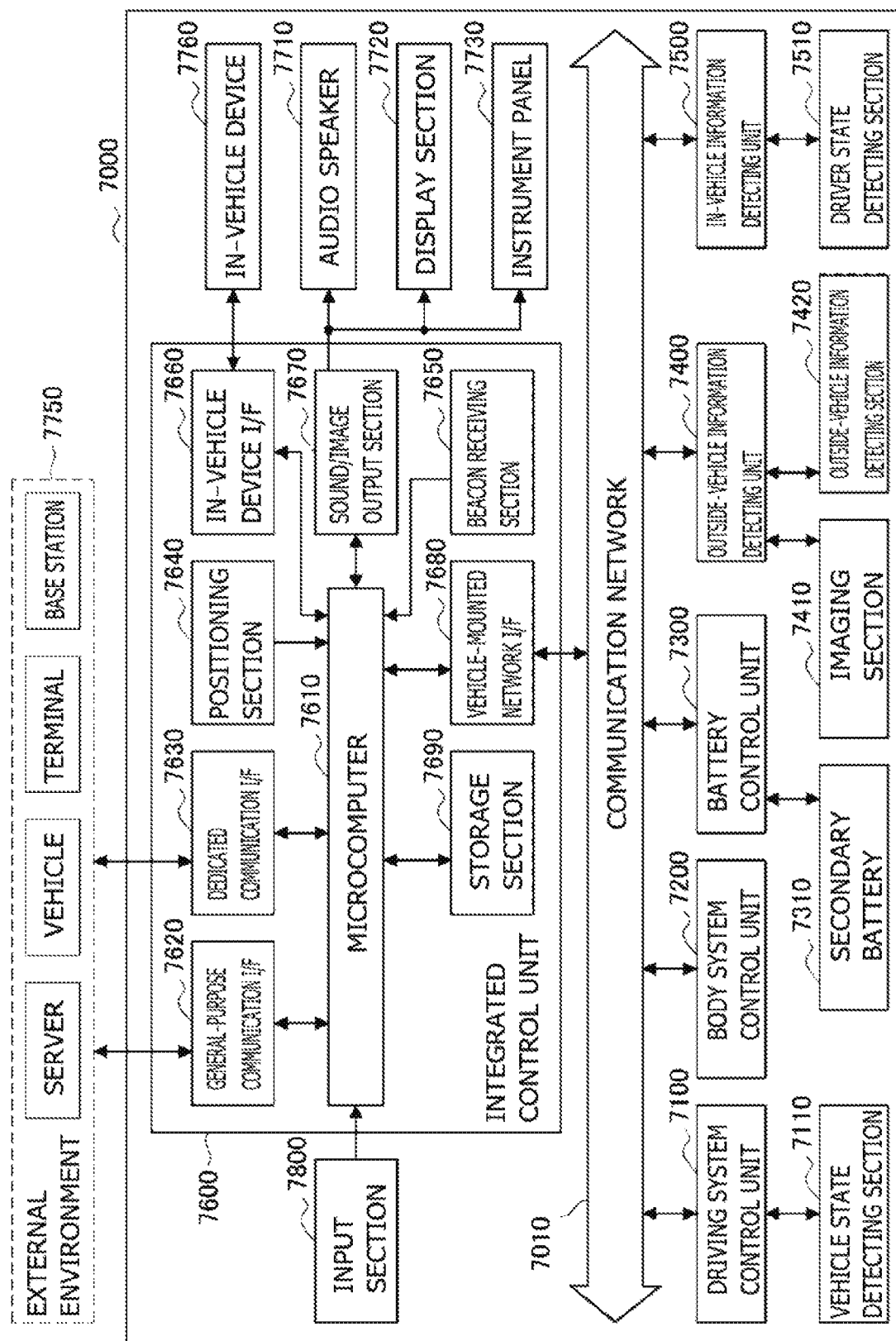
FIG. 1 is a block diagram depicting an example of schematic configuration of a vehicle control system.

1. Movable-Object Control System to Which Information Presentation Apparatus According to Present Technology Can Be Applied FIG. 1 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 1, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Moreover, the vehicle control system 7000 according to this embodiment includes a driving assistance control unit 300.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 1 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

An asymmetric acceleration generating unit 100 is connected to the driving assistance control unit 300. The asymmetric acceleration generating unit 100 is provided in a steering mechanism including the above-mentioned steering wheel and is configured to present haptic feedback information. The haptic feedback information is information for assisting driver's (user's) driving (steering). The driving assistance control unit 300 generates a driving signal in accordance with a program and sends that driving signal to the asymmetric acceleration generating unit 100. The asymmetric acceleration generating unit 100 will be described later in detail.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 2:
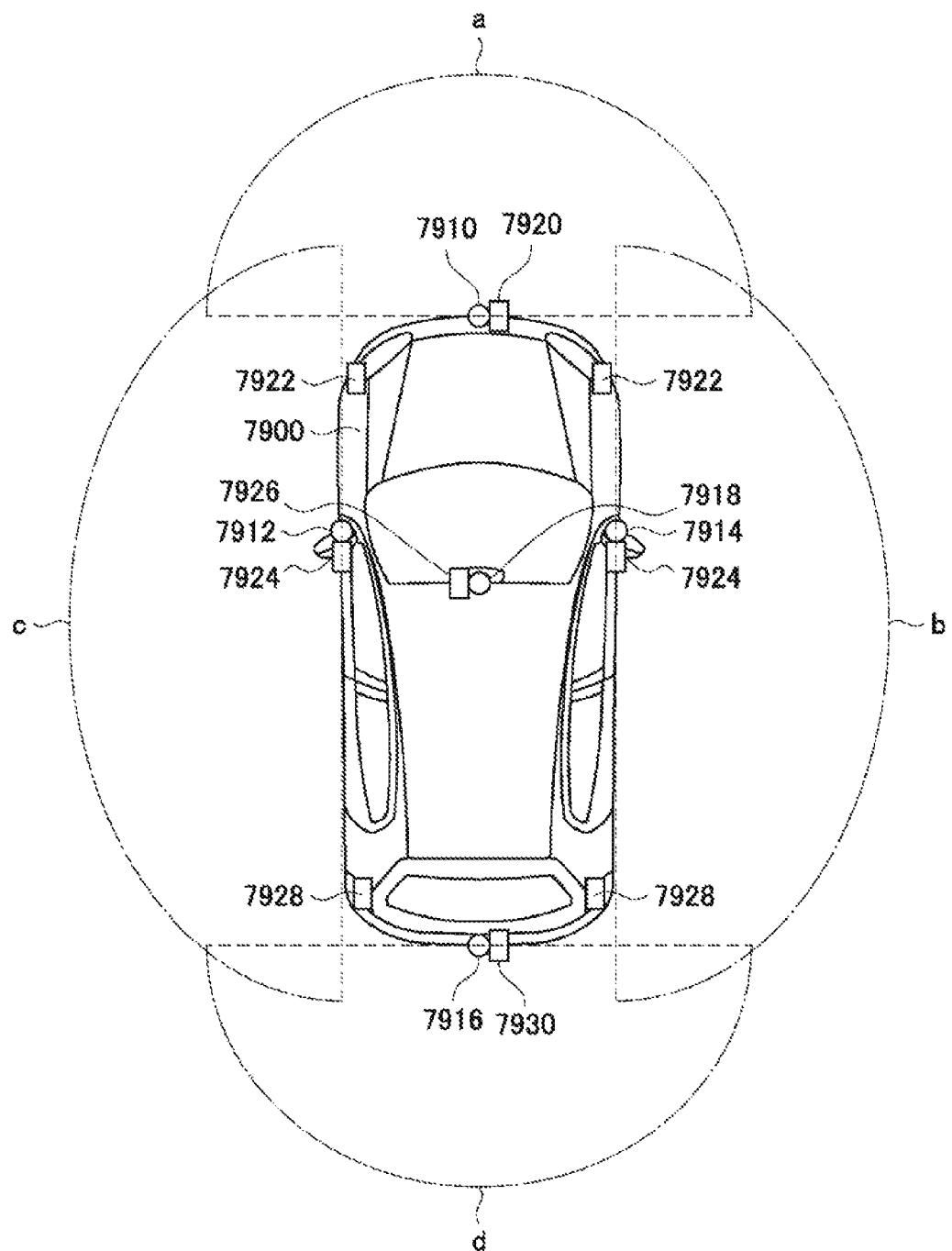
FIG. 2 is a diagram of assistance in explaining an example of installation positions of an outside-vehicle information detecting section and an imaging section.

FIG. 2 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 2 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 1, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

At least one of the in-vehicle information detecting unit 7500, the outside-vehicle information detecting unit 7400, the driver state detecting section 7510, the outside-vehicle information detecting section 7420, the general-purpose communication I/F 7620, the dedicated communication I/F 7630, the positioning section 7640, and the beacon receiving section 7650 functions as an "acquisition unit" that acquires at least either one information of information inside a vehicle or information outside the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

In this embodiment, primarily the microcomputer 7610 and/or the driving assistance control unit 300 functions as a "signal generating unit" that generates a driving signal to drive the asymmetric acceleration generating unit 100 on the basis of information acquired by the above-mentioned "acquisition unit".

The sound/image output section 7670 transmits an output signal of at least one of a sound and an image to an output device capable of visually or auditorily notifying information to an occupant of the vehicle or the outside of the vehicle. In the example of FIG. 1, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 1 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

2. Information Presentation Apparatus

Figure 3:
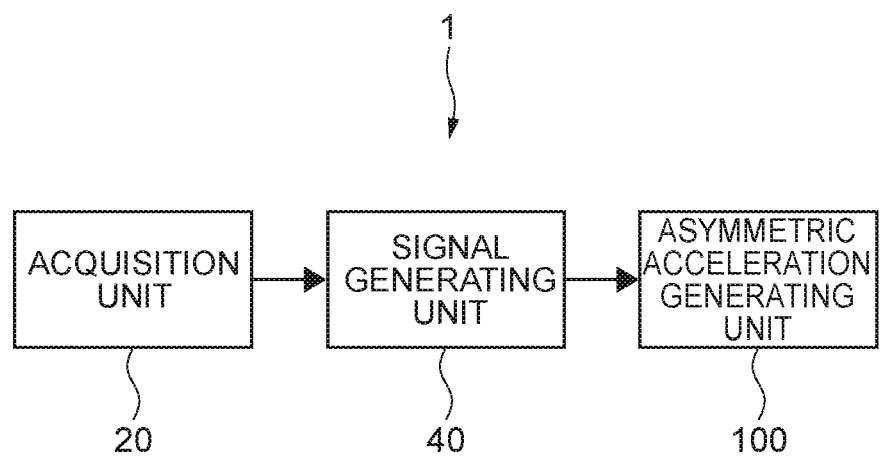
FIG. 3 is a block diagram depicting functional configurations of an information presentation apparatus according to an embodiment.

FIG. 3 is a block diagram depicting functional configurations of an information presentation apparatus according to the embodiment. An information presentation apparatus 1 is an apparatus that presents driving assistance information to the driver. The information presentation apparatus 1 includes the above-mentioned acquisition unit 20, a signal generating unit 40, and the asymmetric acceleration generating unit 100. The signal generating unit 40 generates driving assistance information on the basis of information acquired by the acquisition unit 20 and executes haptic feedback calculation to thereby generate a driving signal.

3. Example of Interior of Automobile to which Steering Apparatus is Applied

Figure 4:
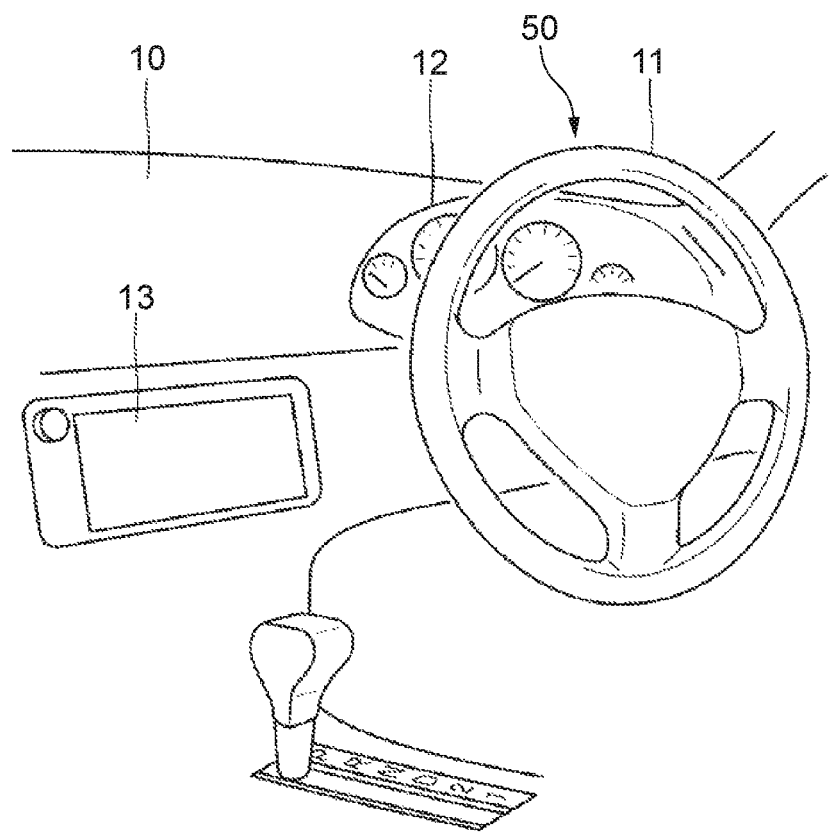
FIG. 4 depicts an example of the interior of an automobile.

FIG. 4 depicts an example of the interior of an automobile. A dashboard (sometimes called dash panel, instrument panel, or the like) 10 is provided under a windshield of the interior of the automobile. The steering wheel 11 is mounted and instruments 12 are provided in front of the driver's sheet on the dashboard 10. The instruments 12 are a speedometer, a tachometer, a fuelmeter, and the like, for example.

A display unit 13 is provided at approximately the center of the dashboard 10. The display unit 13 (the display section 7720 and the like depicted in FIG. 1) is a display panel such as a liquid crystal display (LCD) and an organic electroluminescence (EL), for example. A menu screen, a screen for adjusting an air conditioner, a screen for performing operations related to audio reproduction, a map based on a navigation function, and the like are displayed on the display unit 13.

A vehicle-mounted apparatus that performs various types of control is housed inside the dashboard 10. The vehicle-mounted apparatus is electrically connected to the steering wheel 11. The vehicle-mounted apparatus is an apparatus that mainly configures the integrated control unit 7600 of the above-mentioned vehicle control system 7000. The vehicle-mounted apparatus may also include, otherwise, the driving assistance control unit 300 and other units.

4. Steering Apparatus 4.1) Configuration of Steering Apparatus

Figure 5:
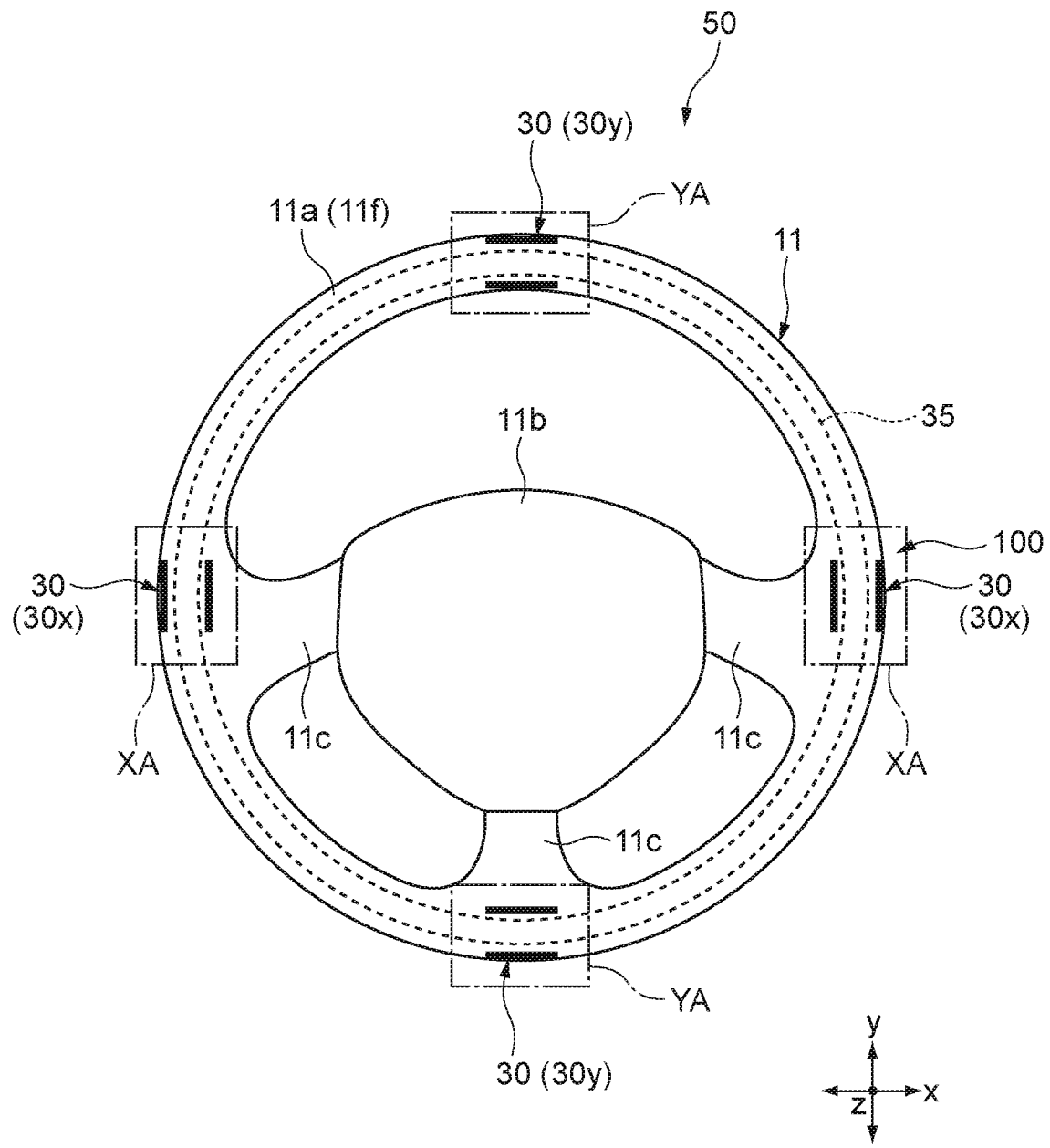
FIG. 5 is a front view depicting a steering apparatus according to the embodiment.

FIG. 5 is a front view depicting the steering apparatus according to the embodiment. A steering apparatus 50 includes a steering wheel 11 which functions as a steering unit and the asymmetric acceleration generating unit 100 that generates asymmetric acceleration in the steering wheel 11. For the sake of description, it is assumed that as viewed facing the steering wheel 11, left and right directions are an x direction and upper and lower directions are a y direction.

The steering wheel 11 includes a frame member 11$f$ (FIGS. 6A and 6B) which configures the entire shape. The frame member 11$f$ has a casing structure and a surface thereof has an exterior coating not depicted in the figures. As depicted in FIG. 5, the steering wheel 11 includes a substantially annular wheel portion 11$a$, a center pad portion 11$b$ provided at the center of the wheel portion 11$a$, and a spoke portion 11$c$ provided between the center pad portion 11$b$ and the wheel portion 11$a$.

Figure 6A:
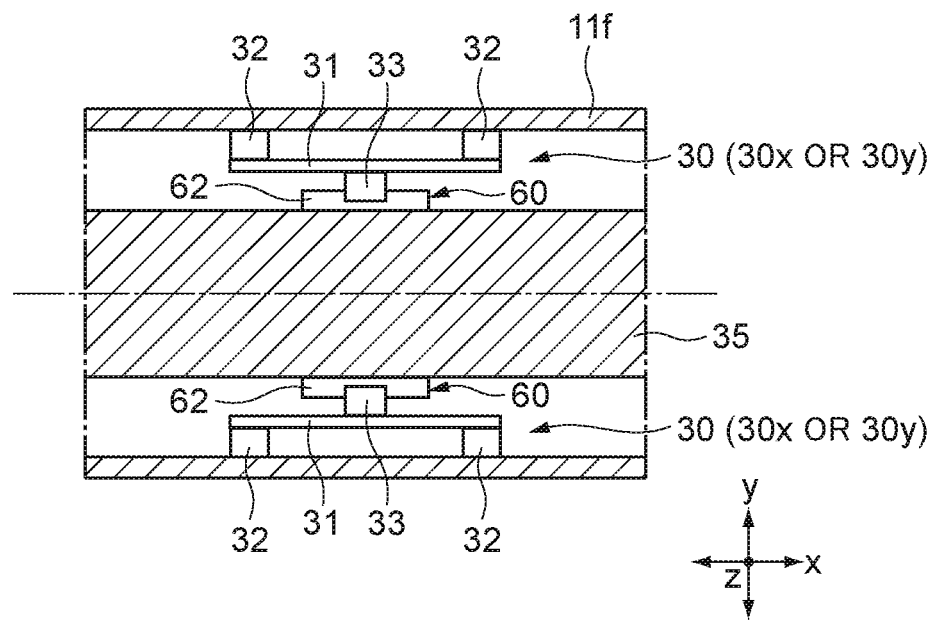
FIG. 6A is a diagram depicting a region of a steering wheel in which an actuator portion is arranged.
Figure 6B:
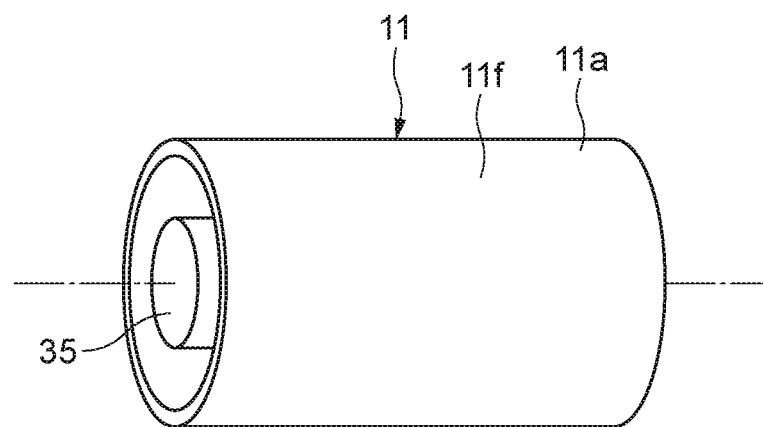
FIG. 6B is a diagram of a part of a steering wheel portion, which includes an inner structure which appears by cutting a direction perpendicular to a circumferential direction of the steering wheel.

The asymmetric acceleration generating unit 100 includes a weight 35 provided inside the frame member 11$f$ and actuators 30 arranged between the frame member 11$f$ and the weight 35. FIG. 6A depicts a region of the steering wheel 11 in which the actuators 30 are arranged. This region indicates a region XA or YA surrounded by a long dashed short dashed line rectangle of FIG. 5. FIG. 6B is a diagram including an inner structure schematically represented by cutting it in a direction perpendicular to a circumferential direction of the steering wheel 11.

As depicted in FIG. 6A, the weight 35 has an annular shape and is arranged at a position corresponding to the wheel portion 11$a$ inside the frame member 11$f$ so as to be supported by the actuators 30.

The weight 35 does not necessarily have an annular shape and may have a circular arc shape or a rectangular parallelepiped shape. Two or more weights having such a circular arc shape may be provided and those may be provided at equiangular intervals or non-equiangular intervals along the circumstance. Due to the annular shape of the weight 35, generated force can be reliably transmitted to driver's hands irrespective of positions of the wheel portion 11$a$, which are held by the driver.

For example, a pair of actuators 30 and 30 support the weight 35 in a sandwiching manner. A plurality of pairs of actuators 30 and 30 are provided at intervals of 90°, for example, in the circumferential direction of the steering wheel 11. Specifically, a pair of x actuators 30$x$ and 30$y$ for x axis driving are provided at two positions (two regions XA) at intervals of 180° and a total of four x actuators 30$x$ are provided. Similarly, a pair of y actuators 30$y$ and 30$y$ are provided at two positions (two regions YA) at intervals of 180° for y axis driving and a total of four y actuators 30$y$ are provided.

Hereinafter, for the sake of description, unless the "x actuator 30$x$" and the "y actuator 30$y$" do not need to be distinguished in description, it will be simply referred to as the "actuator 30" in description.

Figure 7:
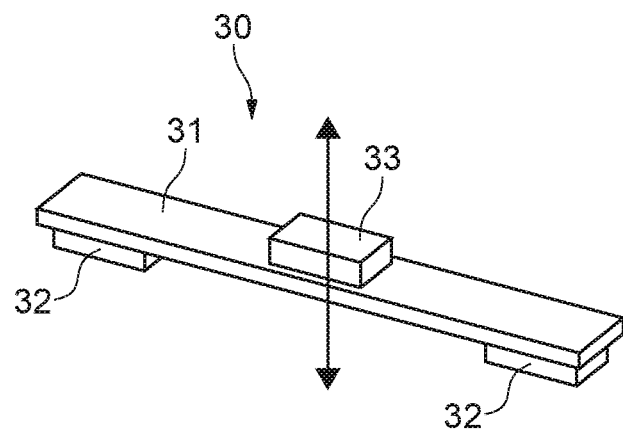
FIG. 7 is a perspective view depicting an example of a configuration of an actuator.

FIG. 7 is a perspective view depicting an example of a configuration of the actuators 30. The actuator 30 includes a plate-shaped piezoelectric element 31 and connection portions 32 and 33 fixed to this piezoelectric element 31, for example. The connection portion 32 is provided at both end portions of the piezoelectric element 31 and is fixed to the frame member 11*f*, for example. The connection portion 33 is provided in the center portion of the piezoelectric element 31 and is connected to the weight 35 via a sliding mechanism 60 to be described later, for example. Although not depicted in the figures, the piezoelectric element 31 is provided with an input terminal for an electrical signal and a driving signal is input. With this, the actuator 30 is adapted to be capable of vibrating the upper and lower directions in FIG. 7, using the connection portions 32 and 32 as nodes and the connection portion 33 as anti-nodes. That is, referring to FIG. 5, the weight 35 becomes capable of vibrating at any direction, amplitude, and acceleration in two axes of the x and y axes, that is, in an x-y plane.

It should be noted that the configuration of the above-mentioned actuator 30 is merely an example and devices having various shapes, sizes, and structures which utilize the piezoelectric element 31 can be applied.

The asymmetric acceleration generating unit 100 may also further include a z actuator. The z actuator is a device capable of vibrating in a direction along a z axis orthogonal to the x and y axes (axis in a direction perpendicular to the sheet in FIG. 5: a third axis). The z actuator can take the structure depicted in FIG. 7 as in the x actuator 30*x* and the y actuator 30*y*. In this case, it is desirable that a plurality of z actuators be also provided. In that case, for example, two z actuators are arranged in the upper and lower directions (y direction) or two z actuators are arranged in the left and right directions (x direction).

As depicted in FIG. 6B, the asymmetric acceleration generating unit 100 includes the sliding mechanism 60 as the supporting mechanism that supports the weight 35. The sliding mechanism 60 is configured to support the weight 35 such that the weight 35 moves in a direction (e.g., orthogonal direction) different from a displacement direction of the piezoelectric element 31 due to asymmetric acceleration generated by that actuator 30.

For example, the sliding mechanism 60 includes a rail portion 62 attached to the weight 35 and is configured to relatively slide the connection portion 33 along the rail portion 62. For example, the x actuator 30*x* includes the rail portion 62 extended in the y direction and the y actuator 30*y* includes the rail portion 62 extended in the x direction. That is, this sliding mechanism 60 has a linear motion guide structure.

Due to the provision of such a sliding mechanism 60, the amount of driving (amplitude) of the actuators 30 in a direction along an axis can be increased. For example, the connection portion 33 of the y actuator 30*y* is movable relative to the rail portion 62 by a range designed in the x direction so as to follow a motion in the x direction of the weight 35 due to vibration in an x axis direction of the x actuator 30*x*. Similarly, the connection portion 33 of the x actuator 30*x* is movable relative to the rail portion 62 by a range designed in the y direction so as to follow a motion in the y direction of the weight 35 due to vibration in a y axis direction of the y actuator 30*y*.

It should be noted that a ball bush structure, a self-lubricating bearing structure, or the like can be applied to the sliding mechanism 60 other than the linear motion guide structure. Alternatively, an elastically deformable material, for example, an anisotropic elastic modulus material may be used as the sliding mechanism 60 rather than the structure in which the connection portion 33 moves along the rail portion 62.

Figure 8:
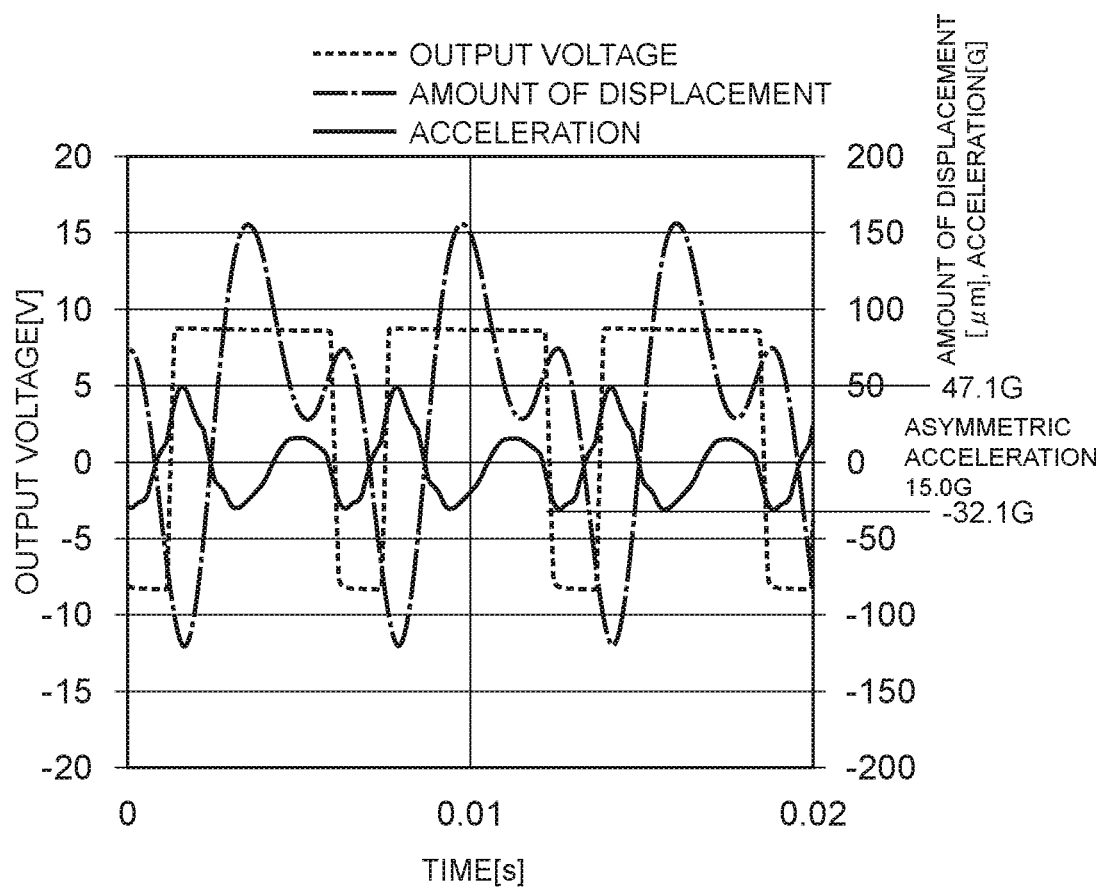
FIG. 8 depicts a result of measuring a displacement and the like of a weight in an axis direction by the actuator connected to a sliding mechanism.

FIG. 8 depicts a result of measuring a displacement and the like of the weight 35 in an axis direction by the actuator 30 connected to the sliding mechanism 60. In this measurement, a weight using a substantially-square outer shape was used. The weight 35 was set to have a weight of 18 g and one having a rectangular parallelepiped shape was used. In this graph, an output voltage (V) to the actuator and acceleration (G) as well as the displacement (μm) are depicted. In accordance with the graph, acceleration of 47.1 G was generated in one direction (positive direction) and acceleration of 32.1 G was generated in a direction opposite thereto (negative direction). Therefore, it can be seen that asymmetric acceleration of 15.0 G was generated in one direction (+direction). The asymmetric acceleration generating unit 100 is capable of presenting various types of haptic feedback information to a driver holding the steering wheel 11 by using generated asymmetric acceleration and a change pattern of that asymmetric acceleration.

A "haptic feedback" is primarily force received from a target object when a person touches the target object. The "haptic feedback" also includes a "tactile feedback" concept. Further, the "haptic feedback" also includes a concept of perceiving force as an illusion, such as a pseudo haptic feedback, a virtual haptic feedback, and an illusion haptic feedback.

A detailed operation principle by the asymmetric acceleration generating unit 100 as described above has been disclosed in International Publication WO 2015/151380.

4.2) Example of Basic Motion of Asymmetric Acceleration Generating Unit

FIGS. 9A, 9B, 9C, 9D, 9E, and 9F depict how the asymmetric acceleration generating unit 100 vibrates in the x axis direction. FIGS. 10A, 10B, 10C, 10D, 10E, and 10F depict how the asymmetric acceleration generating unit 100 vibrates in the y axis direction. These figures depict portions of the steering wheel 11 which correspond to the actuators 30 as in FIG. 6A. Specifically, FIGS. 9A, 9B, and 9C and FIGS. 10A, 10B, and 10C depict the motion of the weight 35 by driving of the y actuators 30*y* and FIGS. 9D 9E, and 9F and FIGS. 10D and 10F depict the motion of the weight 35 by driving of the x actuators 30*x*.

Figure 9C:
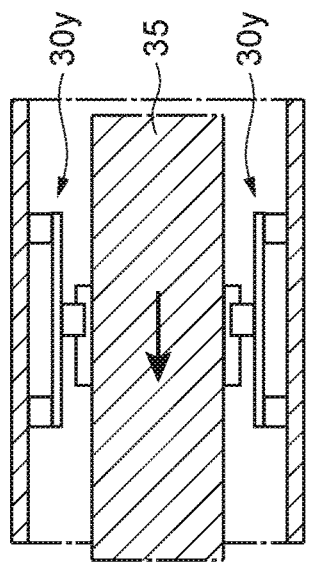
FIGS. 9A, 9B, 9C, 9D, 9E, and 9F are diagrams depicting how an asymmetric acceleration generating unit vibrates in an x axis direction.
Figure 9B:
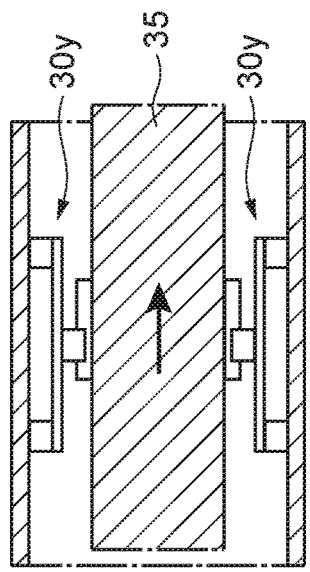
Figure 9A:
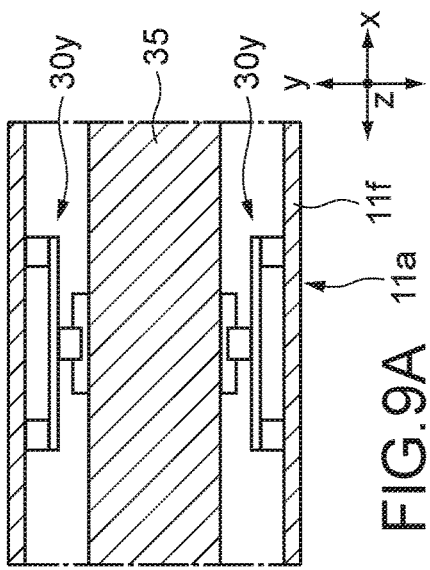
Figure 9F:
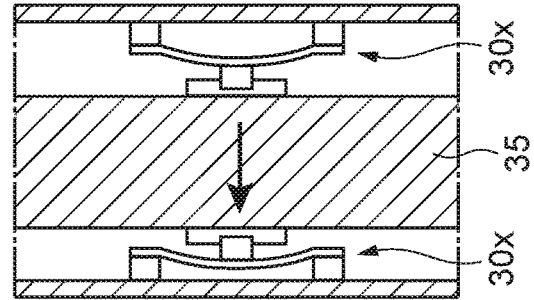
Figure 9E:
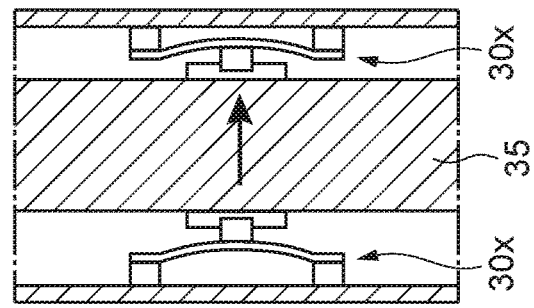
Figure 9D:
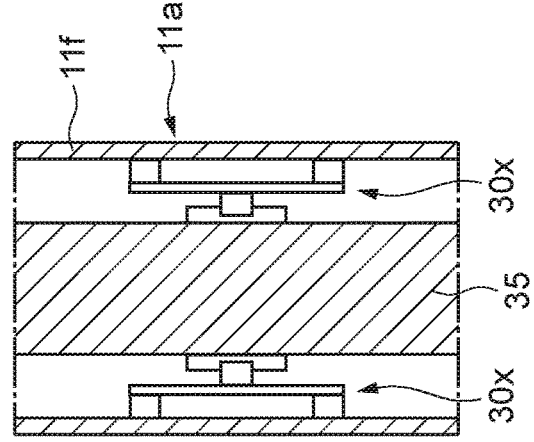

FIGS. 9A and 9D and FIGS. 10A and 10D depict states of the asymmetric acceleration generating unit 100 at a neutral position (the displacement is 0). FIGS. 9B and 9E depict states in which the weight 35 moved in a right-hand direction (which is set as the positive direction) and FIGS. 9C and 9F depict states in which the weight 35 moved in a left-hand direction (which is set as the negative direction). FIGS. 10B and 10E depict states in which the weight 35 moved in the upper direction (which is set as the positive direction) and FIGS. 10C and 10F depict states in which the weight 35 moved in the lower direction (which is set as the negative direction).

For example, as depicted in FIG. 9E, the x actuators 30*x* move in the positive direction. At this time, the weight 35 moves in the positive direction of the x axis, and as depicted in FIG. 9B, the sliding mechanisms 60 connected to the y actuators 30*y* allow a motion of the weight 35 in the positive direction of the x axis. For example, as depicted in FIG. 10C, the y actuators 30*y* move in the negative direction. At this time, the weight 35 moves in the negative direction of the y axis, and as depicted in FIG. 10F, the sliding mechanism 60 connected to the x actuators 30*x* allow a motion of the weight 35 in the negative direction of the y axis.

Figure 11A:
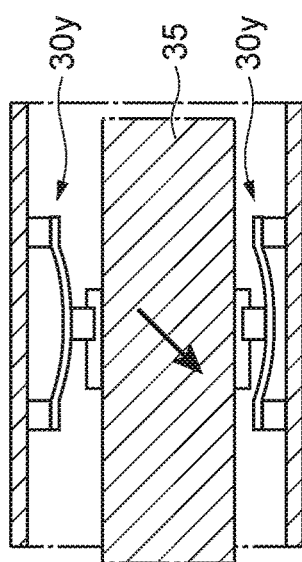
FIGS. 11A, 11B, 11C, 11D, 11E, and 11F are diagrams depicting how x actuators and y actuators vibrate in synchronization along the x and y axes.
Figure 11B:
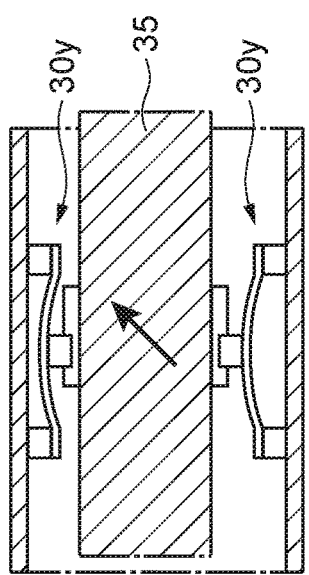
Figure 11C:
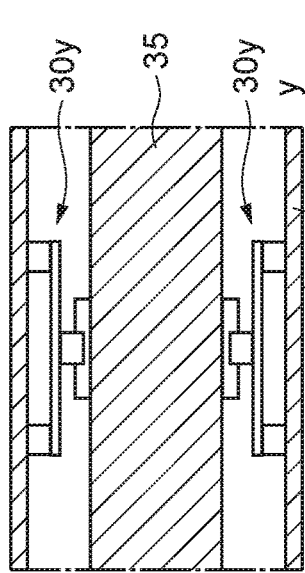
Figure 11D:
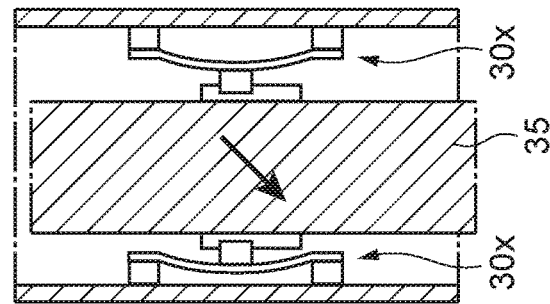
Figure 11E:
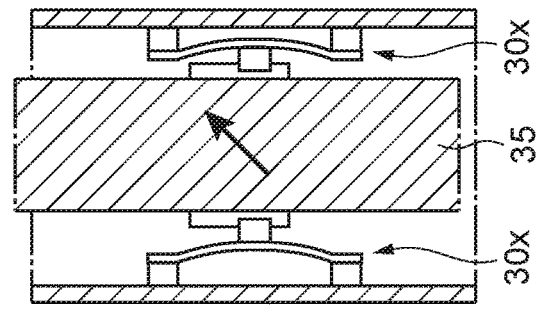
Figure 11F:
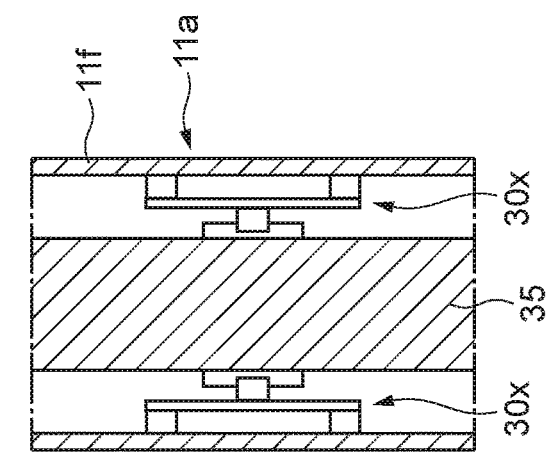

FIGS. 11A, 11B, 11C, 11D, 11E, and 11F depict how the x actuators 30x and the y actuators 30y vibrate at the same amplitude in synchronization along the x and y axes. FIGS. 11A and 11D depict states at the neutral position (the displacement is 0) and FIGS. 11B and 11E depict states in which the weight 35 moved in the positive directions of both the x and y axes. FIGS. 11C and 11F depict states in which the weight 35 moved in the negative directions of both the x and y axes.

In this manner, the asymmetric acceleration generating unit 100 is capable of generating a two-dimensional vibration pattern and is capable of presenting two-dimensional haptic feedback information to the driver holding the steering wheel 11. If the asymmetric acceleration generating unit 100 further includes the z actuators, haptic feedback information within a three-dimensional space can be presented to the driving car.

Figure 12:
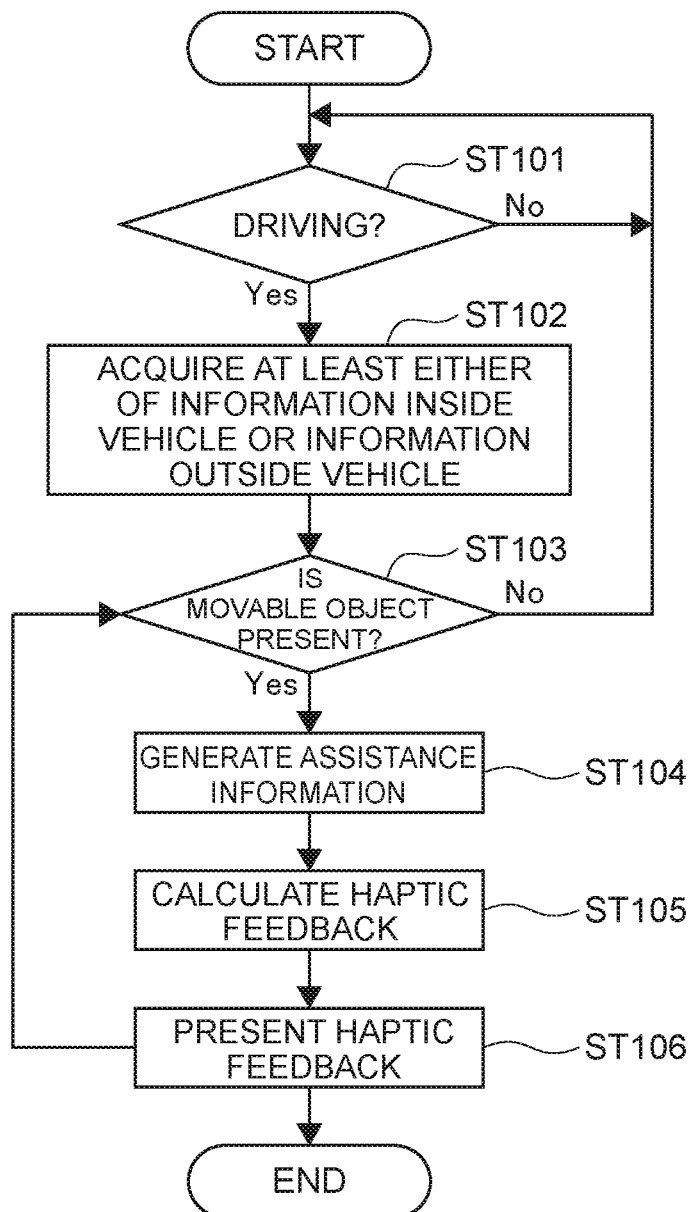
FIG. 12 is a flowchart depicting an operation of the information presentation apparatus.

5. Operation of Information Presentation Apparatus 5.1) Description of Flowchart FIG. 12 is a flowchart depicting an operation of the information presentation apparatus 1. Typically, an example assuming that the information presentation apparatus 1 detects another vehicle (movable object) and haptic feedback information corresponding thereto is presented will be described.

The integrated control unit 7600 determines whether or not the driver is driving a vehicle (Step 101). The determination as to whether or not the driver is driving a vehicle is made on the basis of whether the engine is rotating at predetermined r.p.m. or more, whether the vehicle is travelling at predetermined speed or more, or the like, for example. Alternatively, a determination criterion as to whether the driver is holding the steering wheel 11 may be added to at least one of them. As means for detecting that the driver is holding the steering wheel 11, a pressure sensor, a touch sensor, and the like provided in the steering wheel 11 are exemplified.

If it is determined that the driver is driving the vehicle, the integrated control unit 7600 (here, the acquisition unit 20) acquires information inside the vehicle and/or information outside the vehicle (Step 102). For example, the outside-vehicle information detecting unit 7400 detects a position of the other vehicle (movable object) (a relative position of the movable object relative to the vehicle. The same applies hereinafter.) and a motion and the driving system control unit 7100 detects a steering state of the driver. The steering state is, for example, a driver's steering angle of the steering wheel 11, a position of the steering wheel 11, which is held by the driver, and the like.

If it is clarified by the above-mentioned detection that a movable object is present (Yes in Step 103), the signal generating unit 40 generates a driving signal on the basis of the above-mentioned acquired various types of information. Specifically, the signal generating unit 40 generates assistance information (Step 104) and calculates a haptic feedback (Step 105).

The assistance information is, for example, information including position information of the movable object from the vehicle. The assistance information may otherwise include information regarding whether the position of that movable object is within a predetermined range from the vehicle (whether the movable object is present within a range satisfying a condition for presenting the haptic feedback information) or in what kind of style or in what pattern the haptic feedback corresponding to the position information of the movable object is to be presented. After the haptic feedback is calculated, the signal generating unit 40 sends the driving signal to the asymmetric acceleration generating unit 100 and the asymmetric acceleration generating unit 100 is driven. In this manner, the haptic feedback information is presented to the driver.

In Step 102, a reason why the steering angle is detected will be described. The positions of the four regions XA and YA at which the actuators 30 are arranged on the steering wheel 11, which are depicted in FIG. 5, change relative to the driver in a manner that depends on the steering angle. In order to appropriately perform presentation in the haptic direction for any steering angle, the information presentation apparatus 1 acquires information regarding the steering angle. For example, it is assumed that the driver rotates the steering wheel 11 in a counter-clockwise direction by 45° (a rotation parameter of −45°). Then, the signal generating unit 40 calculates a haptic direction by adding a correction parameter of clockwise 45° (+45°) in the haptic feedback calculation of Step 105.

Figure 13:
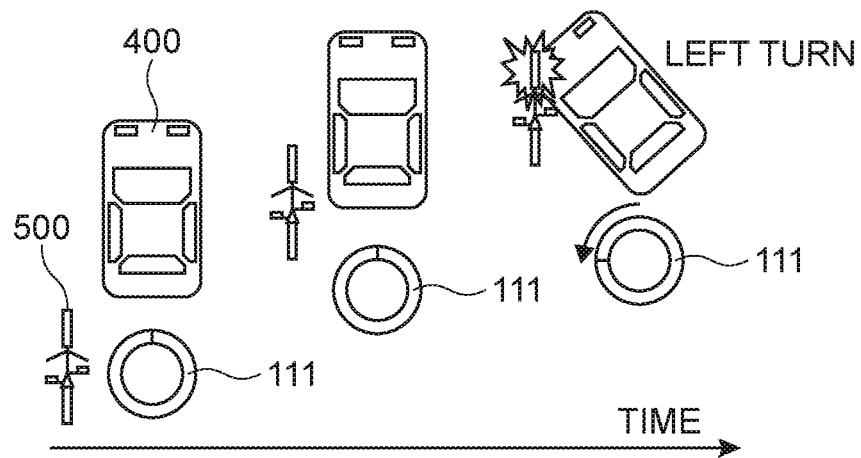
FIG. 13 depicts a situation where involvement at the time of left turn occurs.

5.2) Example in which Position of Movable Object is Presented as Haptic Feedback Information As depicted in FIG. 13, a scene in which a bicycle 500 as the movable object goes straight and an automobile 400 turns left at an intersection is assumed. Further, it is assumed that the vehicle travels in the left lane under traffic provisions. Sign 111 denotes the steering wheel and a rotation state thereof. If the automobile 400 turns left while not sufficiently checking the surroundings due to carelessness of the driver of the automobile 400, there is a possibility that it collides the bicycle 500 and that a so-called "involving" accident occurs.

Figure 14:
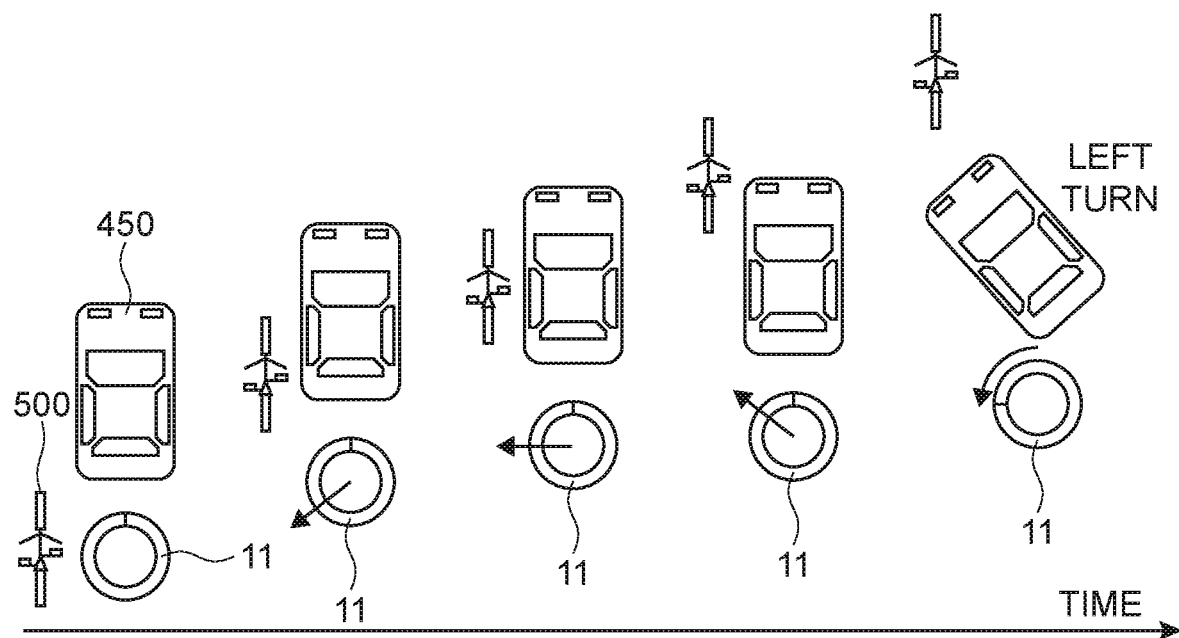
FIG. 14 depicts a haptic feedback presentation method for preventing involvement at the time of left turn in advance.

The information presentation apparatus 1 according to this embodiment can avoid the accident by presenting the presence of danger as depicted in FIG. 13 to the driver of the automobile in advance, as the haptic feedback information (hereinafter, also simply referred to as the haptic feedback). As depicted in FIG. 14, the outside-vehicle information detecting unit 7400 successively detects the position of the bicycle 500 and the signal generating unit 40 successively generates the driving signal of the asymmetric acceleration generating unit 100 which corresponds to that position information.

Here, for example, if the outside-vehicle information detecting unit 7400 detects the position of the bicycle 500 while the position of the bicycle 500 is not present within a predetermined range set as a condition for presenting the haptic feedback, as depicted in the leftmost diagram of FIG. 14, the signal generating unit 40 may be set not to generate the driving signal of the asymmetric acceleration generating unit 100. Alternatively, by using the fact that the outside-vehicle information detecting unit 7400 was detected as a condition, the signal generating unit 40 may be set to generate the driving signal of the asymmetric acceleration generating unit 100.

Figure 15:
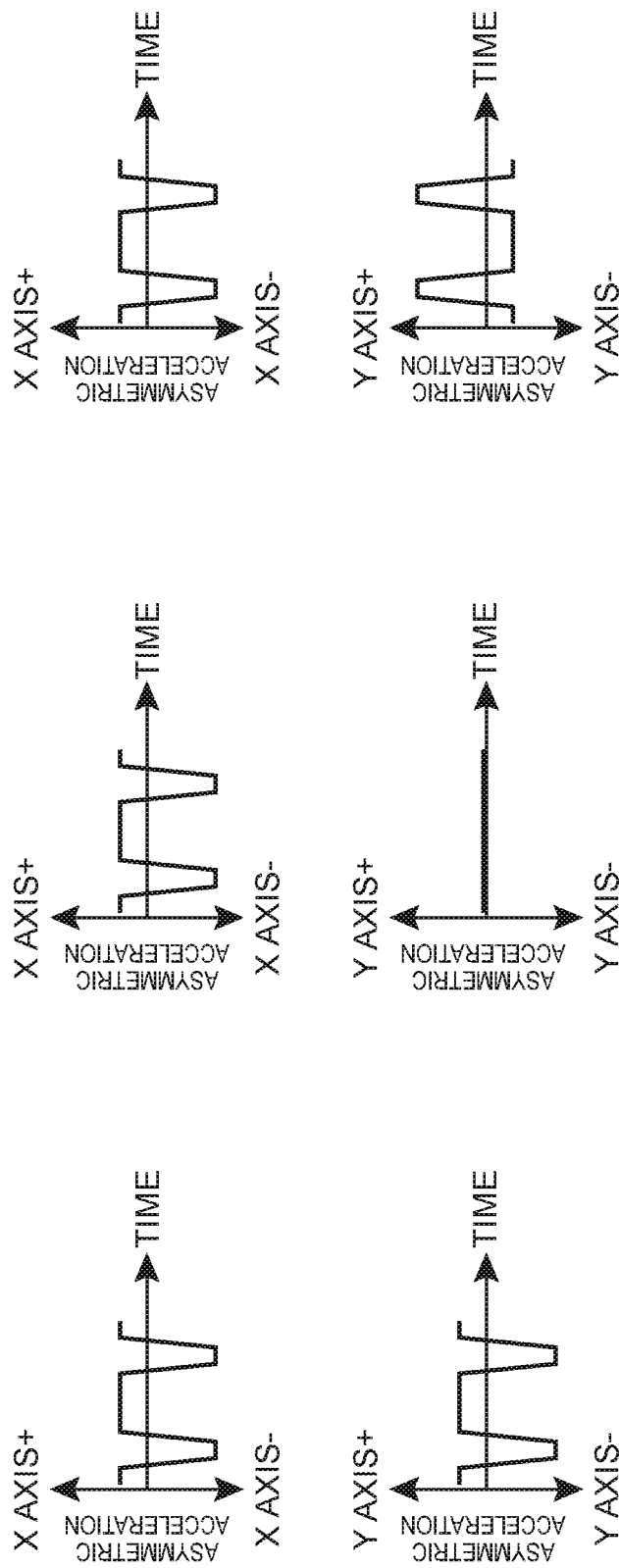
FIGS. 15A, 15B and 15C depicts asymmetric acceleration generated in the asymmetric acceleration generating unit, which each corresponds to a motion of the movable object described in FIG. 14.

When the bicycle 500 is positioned on an diagonally left rear side of an automobile 450 as depicted in the second diagram from the left in FIG. 14 in a case where a condition for presenting the haptic feedback is satisfied, the asymmetric acceleration generating unit 100 generates diagonally left rear asymmetric acceleration corresponding thereto in the weight 35. FIG. 15A depicts a waveform of asymmetric acceleration given to the weight 35 at this time. The asymmetric acceleration has vector components in the negative direction of the x axis and the negative direction of the y axis.

When the bicycle 500 is positioned just beside the automobile 450 as depicted in the third diagram from the left, the asymmetric acceleration generating unit 100 causes the weight 35 to generate the asymmetric acceleration in the left-hand direction which corresponds thereto. FIG. 15B depicts the waveform of the asymmetric acceleration given to the weight 35 at this time. The asymmetric acceleration has a vector in the negative direction of the x axis and is substantially 0 in the y axis direction.

When the bicycle 500 is positioned on an diagonally left front side of the automobile 450 as depicted in the fourth diagram from the left, the asymmetric acceleration generating unit 100 generates diagonally left front asymmetric acceleration corresponding thereto in the weight 35. FIG. 15C depicts the waveform of the asymmetric acceleration given to the weight 35 at this time. The asymmetric acceleration has vector components in the negative direction of the x axis and the positive direction of the y axis.

As depicted in the fifth diagram from the left, at a time when the bicycle 500 passes the diagonally left front side of the automobile 450 and position information for avoiding danger is presented, the driver only needs to steer the steering wheel and make a left turn. In this manner, in accordance with the position of the movable object, the asymmetric acceleration generating unit 100 successively generates the driving signal, such that the information presentation apparatus 1 is capable of dynamically presenting the haptic feedback corresponding to the motion of the movable object to the driver. With this, the driver can intuitively recognize the motion of the movable object with the haptic feedback other than an audiovisual feedback and can avoid danger.

In the above description, the bicycle has been exemplified as the movable object. Otherwise, another automobile, an emergency vehicle, a bike, a pedestrian, a falling object, and the like are exemplified. As a matter of course, not only the scene in which the movable object approaches the vehicle driven by the driver from back but also a scene in which it approaches it from front or in another direction falls within an application range of the present technology.

As described above, in this embodiment, not simple vibration, but the haptic feedback information based on the information inside the vehicle and/or the information outside the vehicle is presented to the driver by the asymmetric acceleration generating unit via the steering unit. With this, the driver can receive presentation of intuitive haptic feedback information and can receive appropriate driving assistance.

6. Other in-Vehicle and Outside-Vehicle Information Examples and Other Presentation Examples of Haptic Feedback Information Example 1

The information presentation apparatus 1 can make use of information acquired from the external environment 7750 and the like as the information outside the vehicle. For example, as information obtained by the general-purpose communication I/F 7620 from the server via the Internet or information obtained by the beacon receiving section 7650, information regarding a danger object such as a road damage (cave-in and the like), an accident site, a construction site, and road surface freezing are exemplified.

In this case, the information presentation apparatus 1 presents the positions of those danger objects relative to the vehicle driven by the driver to the driver as the haptic feedback information. Further, as described in the embodiment of the example of the above-mentioned bicycle 500 (FIG. 14), a sense of direction corresponding to the position of that danger object relative to the vehicle is presented as the haptic feedback.

Example 2

Position information of a special vehicle such as an emergency vehicle is also exemplified as the information regarding the danger object, which is acquired by the general-purpose communication I/F 7620, the dedicated communication I/F 7630, or the beacon receiving section 7650.

Example 3

The information presentation apparatus 1 is capable of presenting navigation-based road information (part of the road traffic information) as the haptic feedback. The road information can be acquired by the beacon receiving section 7650, the general-purpose communication I/F 7620, and the outside-vehicle information detecting unit 7400 other than GPS information. For example, road guide information, for example, going straight, right turn, left turn, going straight in a diagonal right direction, going straight in a diagonal left direction, right sharp curve, and left sharp curve is presented as the haptic feedback.

For example, a haptic feedback in the upper direction (the positive direction of the y axis) is presented in a case of the "going straight" and a haptic feedback in the left-hand direction (the negative direction of the x axis) is presented in a case of the "left turn". For example, a repeated haptic feedback which changes from the upper direction to the right-hand direction is presented for the "right sharp curve". In a case where the asymmetric acceleration generating unit 100 includes the z actuators, a haptic feedback in the positive direction of the z axis may be presented as a forward travel direction of the vehicle in a case of the "going straight".

Road restriction information regarding lane merging, increase/decrease of the number of lanes, and the like are further exemplified as the road information related to the navigation. For example, when the vehicle is approaching a lane merging position, haptic feedback information is presented in the order of "the lane merging position is present in the front" → "the lane merging position is present on the left front side" →"the lane merging is present on the left side". Information regarding closed road and traffic jam is exemplified as other road restriction information.

Example 4

Instead of the above-mentioned road information related to the navigation, the information presentation apparatus 1 is also capable of presenting information indicating a direction of a destination as the haptic feedback. For example, the driver can intuitively recognize the direction of the destination by presenting the direction of the destination, which is a direction of 360° in an x and y axis plane or a direction of 360° in an x and z axis plane, as the haptic feedback. Further, the information presentation apparatus 1 is also capable of variably controlling the magnitude of the asymmetric acceleration, i.e., increasing the magnitude of the asymmetric acceleration as the vehicle approaches the destination, for example.

The "destination" may be a destination specified for each genre, for example, not a single destination, for example. For example, by specifying the destination for each genre such as a "convenience store", a "hospital", and a "park", the information presentation apparatus 1 is capable of searching for another destination of the same genre as it in an area surrounding the vehicle and presenting it as a haptic feedback, even if the vehicle passes a single destination of a certain genre.

Example 5

As still another example of the information acquired outside the vehicle, information regarding the state of a traffic light (part of the road traffic information) can be presented as the haptic feedback. Information regarding the traffic light is acquired by the outside-vehicle information detecting unit 7400 or the beacon receiving section 7650. For example, when detecting that the traffic light will change or is changing to red (stop), the information presentation apparatus 1 presents a haptic feedback in a direction from the front of the driver to the driver (the negative direction of the z axis). Further, when detecting that the traffic light will change to blue (go), the information presentation apparatus 1 presents a haptic feedback in a front direction (the positive direction of the z axis).

Example 6

In order to avoid collision to a danger object such as a movable object, lane departure due to wobble driving, or the like, for example, the information presentation apparatus 1 may present a haptic feedback so as to support steering. For example, in a case where the driver is going to perform steering in the left-hand direction (counter-clockwise direction) while there is a pedestrian on the way, the information presentation apparatus 1 is capable of presenting a haptic feedback for causing the driver to perform steering in the right-hand direction (clockwise direction). In this case, the information presentation apparatus 1 only needs to repeat presentation of the haptic feedback which changes from the upper direction (or the left-hand direction) to the right-hand direction, for example, as a haptic feedback for causing the driver to perform steering in the right-hand direction (clockwise direction). Further, for example, when the vehicle wobbles and is to depart from the lane in the right-hand direction, the information presentation apparatus 1 is capable of presenting a haptic feedback so as to return the vehicle in the left-hand direction, for example, a haptic feedback in the left-hand direction.

In the above descriptions of Examples 1 to 6, the haptic feedback information is information corresponding to the relative positions of the vehicle to the movable object, the danger object, or the destination. However, the haptic feedback information may be information corresponding to a distance (relative distance) between the vehicle and the movable object in addition to it. That is, the information presentation apparatus 1 variably controls the magnitude of the asymmetric acceleration in accordance with the relative distance. For example, the information presentation apparatus 1 is capable of presenting a haptic feedback so as to increase the magnitude of the asymmetric acceleration generated by the asymmetric acceleration generating unit 100 as the relative distance becomes smaller. With this, the driver can intuitively recognize the fact that the degree of hazard increases or the distance to the destination becomes shorter as the relative distance becomes smaller.

Example 7

The information presentation apparatus 1 may acquire, as the information inside the vehicle, a motion or physiological information of the driver from the in-vehicle information detecting unit 7500. For example, the information presentation apparatus 1 is capable of acquiring the fact that the driver is looking aside or is sleeping and presenting a haptic feedback for avoiding danger caused by it. For example, in a case where the vehicle is going straight but the camera detects that the direction of the eyesight or head of the driver keeps a direction other than the front direction for a predetermined time or more, a haptic feedback for causing it to be oriented in the front direction is presented. Alternatively, for example, in a case where the driver is looking aside in the left-hand direction, a haptic feedback in the right-hand direction is presented.

7. Asymmetric Acceleration Generating Unit According to Another Embodiment

Figure 16:
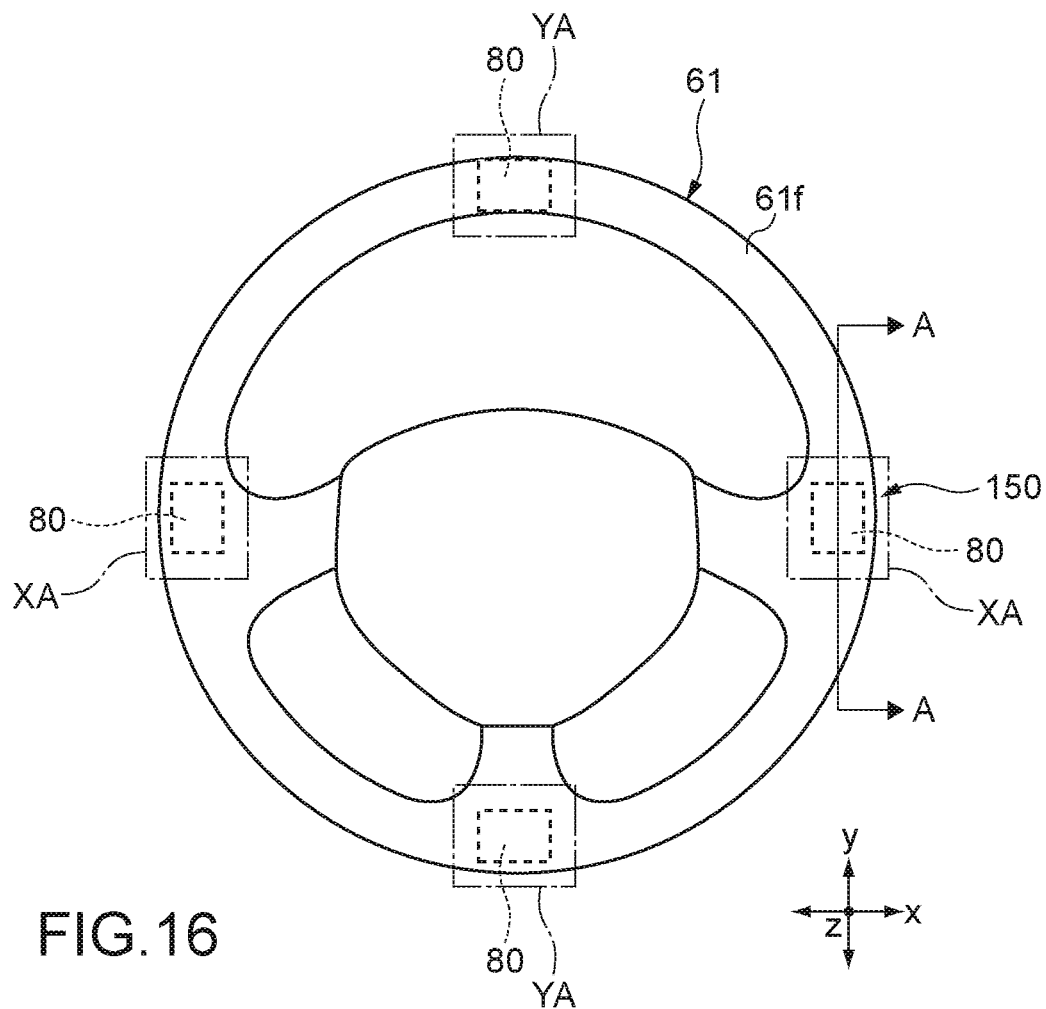
FIG. 16 is a diagram depicting the steering wheel including the asymmetric acceleration generating unit according to another embodiment.

FIG. 16 is a diagram depicting a steering wheel 61 including the asymmetric acceleration generating unit according to another embodiment. An asymmetric acceleration generating unit 150 includes a haptic device 80 provided in each of upper, lower, left, and right four regions (two regions XA and two regions YA) of the steering wheel 61, for example. The haptic device 80 has a block shape, for example. The haptic device 80 includes a casing and includes the actuators 30 and the weight of the above-mentioned embodiment within that casing. Typically, various devices disclosed in International Publication WO 2015/151380 mentioned above are used as the haptic device 80.

Figure 17:
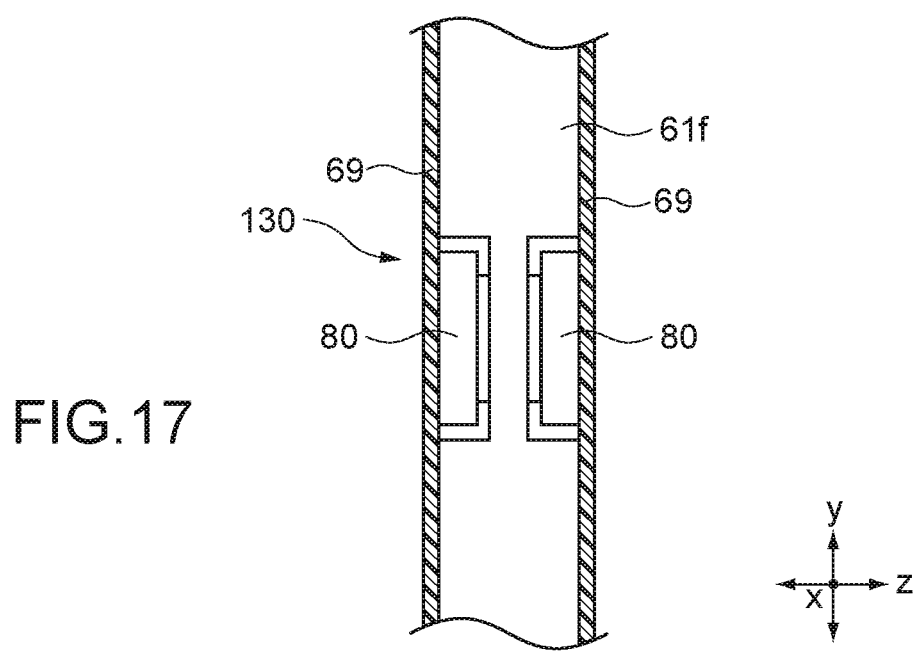
FIG. 17 is a cross-sectional view taken along the line A-A in FIG. 16.

FIG. 17 is a cross-sectional view taken along the line A-A in FIG. 16. A portion denoted by sign 69 is an exterior part. As depicted in FIG. 17, the steering wheel 61 includes a frame member 61*f* within the exterior part not depicted in the figures and the haptic device 80 is attached to a front side facing a driver side of that frame member 61*f* and an opposite side thereof. As a matter of course, the haptic device 80 may be provided in only either one of the front side or the rear side.

The information presentation apparatus may present different types of haptic feedback information at the haptic device 80 on the front side of the frame member 61*f* and the haptic device 80 on the opposite side thereof. For example, the haptic device 80 on the front side may present a haptic feedback corresponding to the position of the movable object and the haptic device 80 on the opposite side thereof may present a haptic feedback corresponding to the navigation-related information.

Other than the four (total of eight) haptic device 80 according to this embodiment, five (total of 10 or more) haptic devices 80 may be provided in the circumstance of the steering wheel 61.

8. Steering Apparatus According to Another Embodiment

Figure 18:
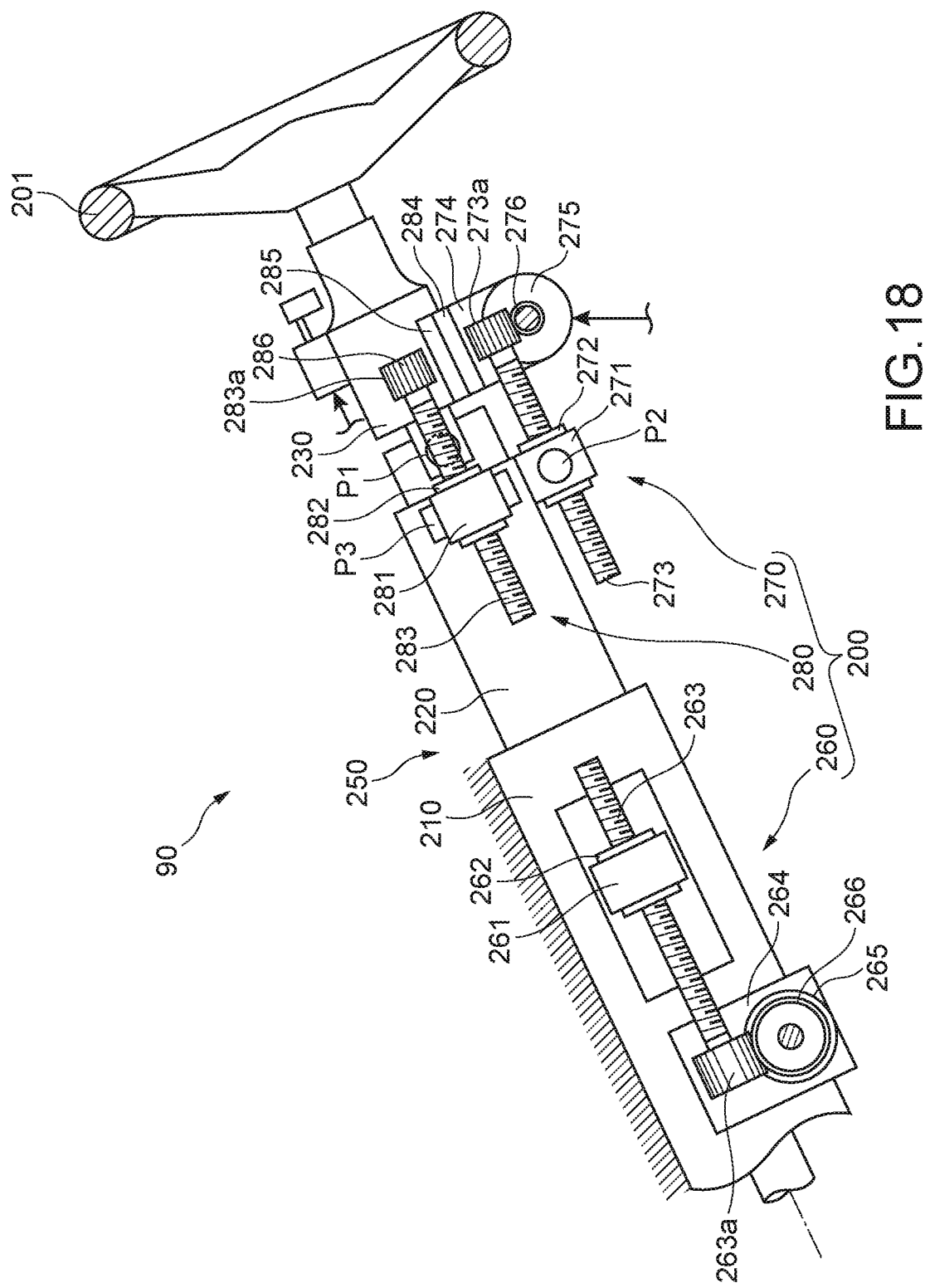
FIG. 18 depicts another steering apparatus according to the embodiment.

FIG. 18 depicts a steering apparatus according to another embodiment. A steering apparatus 90 includes a steering wheel 201, a shaft mechanism 250 that connects this steering wheel 201 to a vehicle body not depicted in the figures, and an asymmetric acceleration generating unit 200 provided in this shaft mechanism 250. The asymmetric acceleration generating unit 200 includes, for example, a telescopic apparatus 260 as a first asymmetric acceleration generating unit, an upper and lower motion tilt apparatus 270 as a second asymmetric acceleration generating unit, and a left and right motion tilt apparatus 280 as a third asymmetric acceleration generating unit.

The above-mentioned signal generating unit 40 is configured to generate a driving signal on the basis of the information acquired by the above-mentioned acquisition unit 20 and send this driving signal to at least one of the telescopic apparatus 260, the upper and lower motion tilt apparatus 270, and the left and right motion tilt apparatus 280.

In the telescopic apparatus 260, a slider 262 is supported by a lower tube 220 via a stay 261. An internally threaded portion is formed in the slider 262. A screw shaft 263 is supported to be movable in an axis direction, meshing with it. On the other hand, an electric motor 265 is supported by a fixed bracket 210 via a holder 264. A worm wheel 266 is fixed to an output shaft of the electric motor 265. A worm 263a that constitutes a worm gear is fixed to a front end of the screw shaft 263, meshing with it. When the electric motor 265 is rotatably driven, the screw shaft 263 rotates about an axis. Then, the slider 262 and the lower tube 220 move in front and rear directions relative to the fixed bracket 210. Thus, the steering wheel 201 moves in front and rear directions. It is adjusted to a desired position in the front and rear directions.

The upper and lower motion tilt apparatus 270 is mounted below the lower tube 220 and an upper tube 230. In the upper and lower motion tilt apparatus 270, a slider 272 is supported on the lower tube 220 to be capable of oscillating about a support point P2 which is a spherical surface via a stay 271. An internally threaded portion is formed inside the slider 272. A screw shaft 273 is supported to be movable in the axis direction, meshing with this. On the other hand, an electric motor 275 is supported on the upper tube 230 via a holder 274. A worm wheel 276 is fixed to an output shaft of the electric motor 275. A worm 273a that constitutes a worm gear, meshing with this, is fixed to a rear end of the screw shaft 273.

When the electric motor 275 is rotationally driven, the screw shaft 273 rotates about an axis and the electric motor 275 moves in the front and rear directions relative to the slider 272. Due to this motion, the electric motor 275 oscillates about the support point P2 and the upper tube 230 oscillates about a support point P1 which is a spherical surface relative to the lower tube 220. As a result, the steering wheel 201 is activated to be tilted in the upper and lower directions and adjusted to be at a desired tilt angle.

The left and right motion tilt apparatus 280 is mounted on a lateral side of the lower tube 220 and the upper tube 230. In the left and right motion tilt apparatus 280, a slider 282 is supported on the lower tube 220 to be capable of oscillating about a support point P3 which is a spherical surface via a stay 281. An internally threaded portion is formed inside the slider 282. A screw shaft 283 is supported to be movable in the axis direction, meshing with this. On the other hand, an electric motor 285 is supported on the upper tube 230 via a holder 284. A worm wheel 286 is fixed to an output shaft of the electric motor 285. A worm 283a that constitutes a worm gear, meshing with this, is fixed to a rear end of the screw shaft 283.

When the electric motor 285 is rotationally driven, the screw shaft 283 rotates about an axis and the electric motor 285 moves in front and rear directions relative to the slider 282. Due to this motion, the electric motor 285 oscillates about the support point P3 and the upper tube 230 oscillates about the support point P1 which is a spherical surface relative to the lower tube 220. As a result, the steering wheel 201 is activated to be tilted in the left and right directions and adjusted to be at a desired tilt angle.

It should be noted that those structures show examples, and the present technology is not limited thereto. The steering apparatus can have any structure as long as the steering wheel 201 is driven in the axis direction (front and rear directions) and an oscillation direction (left, right, upper, and lower directions). It is only necessary to provide a translation structure in a manner that depends on needs.

Figure 19G:
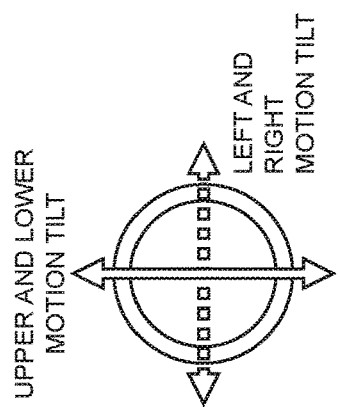
FIGS. 19A, 19B, 19C, 19D, 19E, 19F, and 19G depict a motion of the steering wheel to be driven by the asymmetric acceleration generating unit.
Figure 19E:
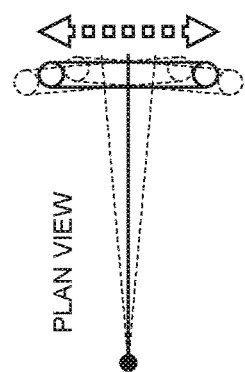
Figure 19F:
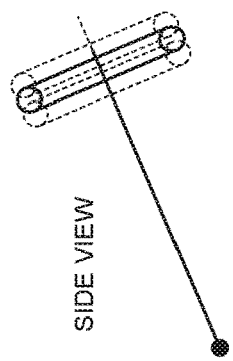
Figure 19C:
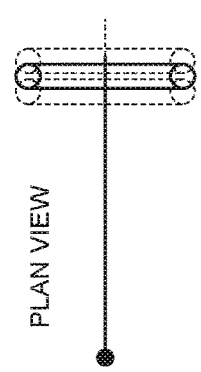
Figure 19D:
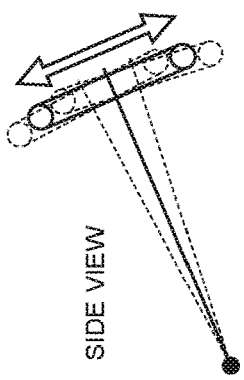
Figure 19A:
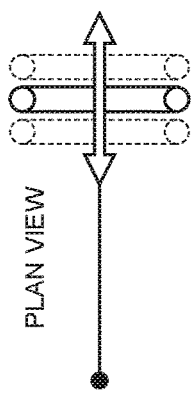
Figure 19B:
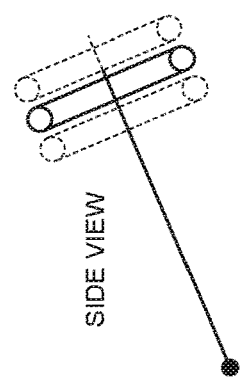

FIGS. 19A and 19B are a top view and a side view each depicting a motion of the steering wheel 201 by driving of the telescopic apparatus 260. FIGS. 19C and 19D are a top view and a side view each depicting a motion of the steering wheel 201 by driving of the upper and lower motion tilt apparatus 270. FIGS. 19E and 19F are a top view and a side view each depicting a motion of the steering wheel 201 by driving of the left and right motion tilt apparatus 280. FIG. 19G is a diagram depicting a motion of the steering wheel 201 as viewed in the axis direction of the shaft mechanism 250 by driving of the upper and lower motion tilt apparatus 270 and the left and right motion tilt apparatus 280.

As depicted in those figures, the steering apparatus 90 is capable of presenting a haptic feedback in an arbitrary direction within the three-dimensional space to the driver by vector addition of that asymmetric acceleration by driving of each of the apparatuses 260, 270, and 280 in three axis directions.

The asymmetric acceleration generating unit may be constituted by one (1-axis driving) or two (two-axis driving) of those telescopic apparatus 260, upper and lower motion tilt apparatus 270, and left and right motion tilt apparatus 280.

As described above, the asymmetric acceleration generating unit 200 does not need to be provided as an inner structure of the steering wheel 201 and can also be provided in the shaft mechanism 250 which is the external mechanism of the steering wheel 201.

9. Various Other Embodiments

The present technology is not limited to the above-mentioned embodiment and various other embodiments can be realized.

The actuator of the above-mentioned asymmetric acceleration generating unit 100 is not limited to the piezoelectric element. For example, a rotating motor or a linear motor (linear actuator) may be used. As a driving method of the actuator, an electromagnetic type, an electrostatic type, a magnetostriction type, a pneumatic type, and a resonance type are exemplified other than the piezoelectric type.

In the embodiment depicted in FIG. 5, the asymmetric acceleration generating unit 100 includes two actuators in each of the four regions XA and YA of the steering wheel 11, a total of eight actuators. However, for example, two actuators may be provided only in each of either one of the upper or lower regions and either one of the left or right regions of the four regions of the steering wheel 61, and a total of four actuators may be provided. In that case, the actuators 30 are not provided in the remaining two regions, and the supporting mechanism that supports the weight 35 only needs to be provided. The supporting mechanism may be a mechanism utilizing an elastically deformable material or may be the above-mentioned various sliding mechanisms that slides the weight.

In the embodiment depicted in FIG. 5, the pair of actuators 30 support to sandwich the weight 35 in any one region of the four regions XA and YA of the steering wheel. However, only one of those pairs may be an actuator 30, the actuator 30 does not need to be provided in the other, and the supporting mechanism may be provided. In that case, if the one actuator 30 is the x actuator 30x, the other supporting mechanism is favorably the sliding mechanism 60 capable of sliding the weight 35 in the y direction.

In the embodiment depicted in FIG. 5, the actuators 30 is provided in the four regions XA and YA of the steering wheel 11. However, a configuration in which the actuators 30 are arranged in the circumferential direction at equiangular intervals or non-equiangular intervals in not only those four regions XA and YA but also regions of five or more regions, for example, may be employed. The same applies to the haptic device 80 depicted in FIGS. 16 and 17.

For example, in the embodiment depicted in FIGS. 16 and 17, in a case where the haptic device 80 is provided in each of six or more or eight or more regions, for example, a held-position detector may detect a position of the steering wheel, which is held by the driver. In this case, the information presentation apparatus may be configured to send a driving signal for haptic feedback presentation to a haptic device closest to the detected held position or a plurality of haptic devices relatively closer to the held position. A pressure sensor, a touch sensor, and the like, for example, are exemplified as a device that detects a held position.

The information presentation apparatus 1 is also applicable to a two-wheeled vehicle (bike, bicycle, and the like) and other special working vehicle other than the automobile.

At least two feature parts of the feature parts of the above-mentioned respective embodiments can also be combined.

It should be noted that the present technology may also take the following configurations.

(1)
An information presentation apparatus, including:
an acquisition unit configured to acquire at least either one of information inside a vehicle or information outside the vehicle;
an asymmetric acceleration generating unit configured to present haptic feedback information to a user via a steering unit provided in the vehicle by generating asymmetric acceleration; and
a signal generating unit configured to generate a driving signal on the basis of information acquired by the acquisition unit and send the driving signal to the asymmetric acceleration generating unit.

(2)
The information presentation apparatus according to (1), in which
the signal generating unit is configured to generate, in accordance with a motion of a movable object within a predetermined range from the vehicle, such a driving signal that the asymmetric acceleration changes.

(3)
The information presentation apparatus according to (2), in which
the signal generating unit is configured to generate, in accordance with a relative position between the vehicle and the movable object, such a driving signal that a direction of the asymmetric acceleration changes.

(4)
The information presentation apparatus according to (2) or (3), in which
the signal generating unit is configured to generate, in accordance with a distance between the vehicle and the movable object, such a driving signal that magnitude of the asymmetric acceleration changes.

(5)
The information presentation apparatus according to (1), further including
a sensor configured to detect a steering angle of the steering unit, in which
the signal generating unit is configured to further generate the driving signal on the basis of the detected steering angle of the steering unit.

(6)
The information presentation apparatus according to (1) or (2), in which
the acquisition unit is configured to acquire a motion or physiological information of a user as the information inside the vehicle.

(7)
The information presentation apparatus according to any one of (1) to (3), in which
the acquisition unit is configured to acquire road traffic information as the information outside the vehicle.

(8)
The information presentation apparatus according to any one of (1) to (7), in which
the asymmetric acceleration generating unit includes a mechanism that generates asymmetric acceleration in directions of one or more axes.

(9)
The information presentation apparatus according to (8), in which
the steering unit includes a frame member, and
the asymmetric acceleration generating unit includes
a weight provided inside the frame member and
an actuator arranged between the frame member and the weight.

(10)
The information presentation apparatus according to any one of (1) to (8), further including
a shaft mechanism that connects the steering unit to a vehicle body, in which
the asymmetric acceleration generating unit is provided in the shaft mechanism.

(11)
The information presentation apparatus according to (10), in which
the asymmetric acceleration generating unit includes at least one of
a first asymmetric acceleration generating unit that generates asymmetric acceleration in an axis direction of the shaft mechanism in the steering unit,
a second asymmetric acceleration generating unit that generates asymmetric acceleration in a second direction in the steering unit, the second direction being orthogonal to the axis direction, and
a third asymmetric acceleration generating unit that generates asymmetric acceleration in a third direction in the steering unit, the third direction being orthogonal to the axis direction and orthogonal to the second direction.

(12)
A steering apparatus, including:
a steering unit; and
an asymmetric acceleration generating unit configured to generate asymmetric acceleration in the steering unit.

(13)
The steering apparatus according to (12), in which
the steering unit includes a frame member, and
the asymmetric acceleration generating unit includes
one or more weights provided inside the frame member and
an actuator arranged between the frame member and the weight.

(14)
The steering apparatus according to (13), in which
the weight has an annular, circular arc, or rectangular parallelepiped shape.

(15)
The steering apparatus according to (13) or (14), in which the asymmetric acceleration generating unit further includes a supporting mechanism that supports the weight.

(16)
The steering apparatus according to (15), in which the supporting mechanism is a sliding mechanism that supports the weight such that the weight moves in a direction different from a direction of the asymmetric acceleration.

(17)
The steering apparatus according to (12), further including
a shaft mechanism that connects the steering unit to a vehicle body, in which
the asymmetric acceleration generating unit is provided in the shaft mechanism.

(18)
The steering apparatus according to (17), in which the asymmetric acceleration generating unit includes at least one of
a first asymmetric acceleration generating unit that generates asymmetric acceleration in an axis direction of the shaft mechanism in the steering unit,
a second asymmetric acceleration generating unit that generates asymmetric acceleration in a second direction in the steering unit, the second direction being orthogonal to the axis direction, and
a third asymmetric acceleration generating unit that generates asymmetric acceleration in a third direction in the steering unit, the third direction being orthogonal to the axis direction and orthogonal to the second direction.

(19)
An information presentation method, including:
acquiring at least either one of information inside a vehicle or information outside the vehicle;
generating a driving signal on the basis of the acquired information; and
sending the generated driving signal to an asymmetric acceleration generating unit configured to present haptic feedback information to a user via a steering unit provided inside the vehicle due to generation of asymmetric acceleration.

REFERENCE SIGNS LIST 1 information presentation apparatus
11, 61, 201 steering wheel
11*f*, 61*f* frame member
20 acquisition unit
30 actuator
35 weight
40 signal generating unit
50, 90 steering apparatus
60 sliding mechanism
61*f* frame member
80 haptic device
100, 150, 200 asymmetric acceleration generating unit
250 shaft mechanism
260 telescopic apparatus
270 upper and lower motion tilt apparatus
280 left and right motion tilt apparatus
7110 vehicle state detecting section
7400 outside-vehicle information detecting unit
7410 imaging section
7420 outside-vehicle information detecting section
7500 in-vehicle information detecting unit
7510 driver state detecting section
7600 integrated control unit
7610 microcomputer
7640 positioning section
7650 beacon receiving section
7920 outside-vehicle information detecting section

The invention claimed is:

1. An information presentation apparatus, comprising:
a processor configured to:
acquire at least one of first information about an inside of a vehicle or second information about an outside of the vehicle; and
generate a first driving signal based on the acquired at least one of the first information or the second information; and
a first asymmetric acceleration generating unit that comprises:
a weight inside a frame member of a steering unit of the vehicle, and
an actuator between the frame member and the weight, wherein the actuator is configured to:
receive the first driving signal; and
move, based on the received first driving signal, the weight to generate an asymmetric acceleration in a specific direction of at least one axis, and
the first asymmetric acceleration generating unit is configured to present, based on the generated asymmetric acceleration, haptic feedback information to a user via the steering unit.

2. The information presentation apparatus according to claim 1, wherein
the processor is further configured to generate a second driving signal based on a motion of a movable object within a specific range from the vehicle, and
the generated asymmetric acceleration changes based on the second driving signal.

3. The information presentation apparatus according to claim 2, wherein
the processor is further configured to generate a third driving signal based on a relative position between the vehicle and the movable object, and
the specific direction of the generated asymmetric acceleration changes based on the third driving signal.

4. The information presentation apparatus according to claim 2, wherein
the processor is further configured to generate a third driving signal based on a distance between the vehicle and the movable object, and
a magnitude of the generated asymmetric acceleration changes based on the third driving signal.

5. The information presentation apparatus according to claim 1, further comprising a sensor configured to detect a steering angle of the steering unit,
wherein the processor is further configured to generate the first driving signal based on the detected steering angle of the steering unit.

6. The information presentation apparatus according to claim 1, wherein the processor is further configured to acquire, as the first information, at least one of a motion of the user or physiological information of the user.

7. The information presentation apparatus according to claim 1, wherein the processor is further configured to acquire road traffic information as the second information.

8. The information presentation apparatus according to claim 1, further comprising:
a shaft mechanism configured to connect the steering unit to a vehicle body of the vehicle; and a second asymmetric acceleration generating unit in the shaft mechanism.

9. The information presentation apparatus according to claim 8, wherein the second asymmetric acceleration generating unit includes at least one of:
   a telescopic apparatus configured to generate the asymmetric acceleration in an axis direction of the shaft mechanism in the steering unit;
   an upper and lower motion tilt apparatus configured to generate the asymmetric acceleration in a first direction in the steering unit,
      wherein the first direction is orthogonal to the axis direction; and
   a left and right motion tilt apparatus configured to generate the asymmetric acceleration in a second direction in the steering unit,
      wherein the second direction is orthogonal to each of the axis direction and the first direction.

10. A steering apparatus, comprising:
   a steering unit that includes a frame member; and
   a first asymmetric acceleration generating unit that includes:
      at least one weight inside the frame member; and
      an actuator between the frame member and the weight, wherein
         the actuator is configured to move the at least one weight to generate an asymmetric acceleration in the steering unit.

11. The steering apparatus according to claim 10, wherein the at least one weight has one of an annular shape, a circular arc shape, or a rectangular parallelepiped shape.

12. The steering apparatus according to claim 10, wherein the first asymmetric acceleration generating unit further includes a supporting mechanism configured to support the at least one weight.

13. The steering apparatus according to claim 12, wherein the supporting mechanism is a sliding mechanism, and the at least one weight is configured to move in a direction different from a direction of the asymmetric acceleration.

14. The steering apparatus according to claim 10, further comprising:
   a shaft mechanism configured to connect the steering unit to a vehicle body; and
   a second asymmetric acceleration generating unit in the shaft mechanism.

15. The steering apparatus according to claim 14, wherein the second asymmetric acceleration generating unit includes at least one of:
   a telescopic apparatus configured to generate the asymmetric acceleration in an axis direction of the shaft mechanism in the steering unit;
   an upper and lower motion tilt apparatus configured to generate the asymmetric acceleration in a first direction in the steering unit,
      wherein the first direction is orthogonal to the axis direction; and
   a left and right motion tilt apparatus configured to generate the asymmetric acceleration in a second direction in the steering unit,
      wherein the second direction is orthogonal to each of the axis direction and the first direction.

16. An information presentation method, comprising:
   acquiring, by a processor, at least one of first information about an inside of a vehicle or second information about an outside of the vehicle;
   generating, by the processor, a driving signal based on the acquired at least one of the first information or the second information;
   sending, by the processor, the driving signal to an asymmetric acceleration generating unit,
      the asymmetric acceleration generating unit includes:
         a weight inside a frame member of a steering unit of the vehicle, and
         an actuator between the frame member and the weight;
   moving, by the actuator based on the driving signal, the weight to generate an asymmetric acceleration in a specific direction of at least one axis; and
   presenting, by the asymmetric acceleration generating unit based on the generated asymmetric acceleration, haptic feedback information to a user via the steering unit.

17. A steering apparatus, comprising:
   a steering unit;
   a shaft mechanism configured to connect the steering unit to a vehicle body; and
   an asymmetric acceleration generating unit in the shaft mechanism,
      wherein the asymmetric acceleration generating unit includes at least one of:
         a telescopic apparatus configured to generate an asymmetric acceleration in an axis direction of the shaft mechanism in the steering unit,
         an upper and lower motion tilt apparatus configured to generate the asymmetric acceleration in a first direction in the steering unit,
            wherein the first direction is orthogonal to the axis direction, and
         a left and right motion tilt apparatus configured to generate the asymmetric acceleration in a second direction in the steering unit,
            wherein the second direction is orthogonal to each of the axis direction and the first direction.

\* \* \* \* \*